United States Patent
Murayama et al.

(10) Patent No.: US 11,535,548 B2
(45) Date of Patent: Dec. 27, 2022

(54) GLASS FOR CHEMICAL STRENGTHENING, CHEMICALLY STRENGTHENED GLASS AND METHOD FOR MANUFACTURING CHEMICALLY STRENGTHENED GLASS

(71) Applicant: AGC INC., Chiyoda-ku (JP)

(72) Inventors: Suguru Murayama, Tokyo (JP); Satoshi Kanasugi, Tokyo (JP); Madoka Ono, Tokyo (JP)

(73) Assignee: AGC INC., Chiyoda-ku (JP)

(*) Notice: Subject to any disclaimer, the term of this patent is extended or adjusted under 35 U.S.C. 154(b) by 781 days.

(21) Appl. No.: 16/386,317

(22) Filed: Apr. 17, 2019

(65) Prior Publication Data

US 2019/0263713 A1 Aug. 29, 2019

Related U.S. Application Data

(63) Continuation of application No. PCT/JP2017/037087, filed on Oct. 12, 2017.

(30) Foreign Application Priority Data

Oct. 18, 2016 (JP) .............................. JP2016-204745
Jul. 20, 2017 (JP) .............................. JP2017-141283

(51) Int. Cl.

| C03C 3/083 | (2006.01) |
|---|---|
| C03B 23/03 | (2006.01) |
| C03C 3/085 | (2006.01) |
| C03C 3/087 | (2006.01) |
| C03C 3/091 | (2006.01) |
| C03C 3/093 | (2006.01) |
| C03C 3/097 | (2006.01) |
| C03C 21/00 | (2006.01) |
| C03B 23/035 | (2006.01) |
| C03B 23/025 | (2006.01) |

(52) U.S. Cl.
CPC .......... *C03C 3/083* (2013.01); *C03B 23/0302* (2013.01); *C03C 3/085* (2013.01); *C03C 3/087* (2013.01); *C03C 3/091* (2013.01); *C03C 3/093* (2013.01); *C03C 3/097* (2013.01); *C03C 21/00* (2013.01); *C03C 21/002* (2013.01); *C03B 23/0252* (2013.01); *C03B 23/0357* (2013.01)

(58) Field of Classification Search
CPC .......... C03C 3/08; C03C 3/085; C03C 3/087; C03C 3/091; C03C 3/093; C03C 3/097; C03C 21/00; C03C 21/002; C03C 3/083
See application file for complete search history.

(56) References Cited

U.S. PATENT DOCUMENTS

| 5,674,790 A | 10/1997 | Araujo |
| 6,333,285 B1 | 12/2001 | Chopinet et al. |
| 6,518,211 B1 | 2/2003 | Bradshaw et al. |
| 2001/0049327 A1 | 12/2001 | Hachitani |
| 2003/0109370 A1 | 6/2003 | Ikenishi et al. |
| 2004/0180239 A1 | 9/2004 | Ikenishi et al. |
| 2005/0090377 A1 | 4/2005 | Shelestak et al. |
| 2006/0063009 A1 | 3/2006 | Naitou et al. |
| 2006/0205584 A1 | 9/2006 | Ikenishi et al. |
| 2007/0060465 A1 | 3/2007 | Varshneya et al. |
| 2008/0020919 A1 | 1/2008 | Murata |
| 2009/0220824 A1 | 9/2009 | Ikenishi et al. |
| 2009/0263662 A1 | 10/2009 | Shelestak et al. |
| 2010/0160141 A1 | 6/2010 | Ikenishi et al. |
| 2010/0167091 A1 | 7/2010 | Tachiwana et al. |
| 2010/0233407 A1 | 9/2010 | Shelestak et al. |
| 2011/0079048 A1 | 4/2011 | Shelestak et al. |
| 2011/0274916 A1 | 11/2011 | Murata |
| 2011/0312483 A1 | 12/2011 | Nakashima et al. |
| 2012/0021892 A1 | 1/2012 | Tachiwana et al. |
| 2012/0052271 A1 | 3/2012 | Gomez et al. |
| 2012/0264585 A1 | 10/2012 | Ohara et al. |
| 2012/0321898 A1 | 12/2012 | Meinhardt et al. |
| 2012/0328907 A1 | 12/2012 | Tachiwana et al. |
| 2013/0040169 A1 | 2/2013 | Ikenishi et al. |

(Continued)

FOREIGN PATENT DOCUMENTS

| CN | 102167509 A | 8/2011 |
| JP | 60-180936 A | 9/1985 |

(Continued)

OTHER PUBLICATIONS

International Search Report and Written Opinion dated Apr. 25, 2017 in PCT/JP2017/001755, 20 pages (with English translation).
International Search Report and Written Opinion dated Mar. 21, 2017 in PCT/JP2017/001742, 22 pages (with English translation).
Burggraaf, A.J. "The strengthening of glass by ion exchange. Part 2. Stress formation and stress relaxation after ion exchange in alkali aluminosilicate glasses in connection with structural changes in the glass" Physics and Chemistry of Glasses, Society of Glass Technology, vol. 7, No. 5, 1966, 6 pages.
Makishima, A. et al. "Glass Materials Design System: VitreES" Fujitsu, vol. 44, No. 6, 1993, 7 pages (with English abstract).

(Continued)

*Primary Examiner* — Elizabeth A. Bolden

(74) *Attorney, Agent, or Firm* — Oblon, McClelland, Maier & Neustadt, L.L.P.

(57) ABSTRACT

A glass for chemical strengthening has a Young's modulus E of 70 GPa or more. The glass satisfies $X_1+X_2+X_3$ being 1760 or less. Here, $X_1$ is a numerical value equivalent to a value [unit: kPa/° C.] obtained by multiplying the Young's modulus E by an average coefficient $\alpha$ of thermal expansion at 50° C. to 350° C., $X_2$ is a numeral value equivalent to a value of a temperature Tf [unit: ° C.] at which a viscosity of the glass reaches 100 MPa·s, and $X_3$ is a numerical value equivalent to a value of a difference [unit: $10^5$ Pa·s] between the viscosity (100 MPa·s) at the Tf and a viscosity $\eta_{+10}$ at a temperature 10° C. higher than the Tf.

20 Claims, 1 Drawing Sheet

(56) References Cited

U.S. PATENT DOCUMENTS

| | | |
|---|---|---|
| 2013/0183512 A1 | 7/2013 | Gy et al. |
| 2013/0186140 A1 | 7/2013 | Brix et al. |
| 2013/0189486 A1 | 7/2013 | Wang et al. |
| 2014/0230492 A1 | 8/2014 | Murata |
| 2014/0302346 A1 | 10/2014 | Tachiwana et al. |
| 2014/0356576 A1 | 12/2014 | Dejneka et al. |
| 2014/0364298 A1 | 12/2014 | Ohara et al. |
| 2015/0030840 A1 | 1/2015 | Gomez et al. |
| 2015/0259244 A1 | 9/2015 | Amin et al. |
| 2015/0368140 A1 | 12/2015 | Ikemoto et al. |
| 2016/0347655 A1 | 12/2016 | Meinhardt et al. |
| 2017/0022092 A1* | 1/2017 | DeMartino ........... G06F 1/1637 |
| 2018/0186685 A1 | 7/2018 | Murayama et al. |
| 2018/0265397 A1 | 9/2018 | Murayama et al. |
| 2018/0319706 A1 | 11/2018 | Murayama et al. |
| 2018/0327304 A1 | 11/2018 | Murayama et al. |
| 2019/0202730 A1 | 7/2019 | Gomez et al. |

FOREIGN PATENT DOCUMENTS

| | | |
|---|---|---|
| JP | 2000-516903 A | 12/2000 |
| JP | 2001-302278 A | 10/2001 |
| JP | 2002-507538 A | 3/2002 |
| JP | 2002-174810 A | 6/2002 |
| JP | 2002-358626 A | 12/2002 |
| JP | 2004-131314 A | 4/2004 |
| JP | 2006-83045 A | 3/2006 |
| JP | 2007-527354 A | 9/2007 |
| JP | 2008-1590 | 1/2008 |
| JP | 2010-116276 A | 5/2010 |
| JP | 2010-168233 | 8/2010 |
| JP | 2010-202514 A | 9/2010 |
| JP | 2011-136895 A | 7/2011 |
| JP | 2012-20921 A | 2/2012 |
| JP | 2012-232882 | 11/2012 |
| JP | 2013-520385 | 6/2013 |
| JP | 2013-520387 | 6/2013 |
| JP | 2013-520388 | 6/2013 |
| JP | 2013-536155 A | 9/2013 |
| JP | 2013-542159 A | 11/2013 |
| JP | 2018-519228 A | 7/2018 |
| WO | WO 2007/142324 A1 | 12/2007 |
| WO | WO 2014/167894 A1 | 10/2014 |
| WO | WO 2015/127483 A2 | 8/2015 |
| WO | WO 2017/126607 A1 | 7/2017 |

OTHER PUBLICATIONS

International Search Report dated Jan. 9, 2018 in PCT/JP2017/037087 filed on Oct. 12, 2017 (with English Translation).

Written Opinion dated Jan. 9, 2018 in PCT/JP2017/037087 filed on Oct. 12, 2017.

Writing Group of "Basic Knowledge of Fluorescent Lamp Production", "Basic Knowledge of Fluorescent Lamp Production" China Light Industry Press, p. 108, Apr. 1983 vol. 1 (with English abstract).

Tian Ying-liang et al., "New Glass Technology", p. 114, China Light Industry (with English abstract).

* cited by examiner

GLASS FOR CHEMICAL STRENGTHENING, CHEMICALLY STRENGTHENED GLASS AND METHOD FOR MANUFACTURING CHEMICALLY STRENGTHENED GLASS

TECHNICAL FIELD

The present invention relates to a glass for chemical strengthening and a chemically strengthened glass, and further relates to a method for manufacturing a chemically strengthened glass.

BACKGROUND ART

Thin and high-strength chemically strengthened glasses are used as cover glasses for display devices of mobile devices such as mobile phones and smart phones and cover glasses for onboard display members such as instrument panels and head-up displays (HUDs). In these display devices, a cover glass having a curved surface shape is sometimes required to improve operability and visibility. The cover glass having the curved surface shape can be produced by heating a flat glass sheet and bend-forming it into the curved surface shape using a forming mold (also referred to as three-dimensional forming) (see Patent Literature 1).

Patent Literature 2 discloses a lithium aluminosilicate glass having a glass transition temperature of 550° C. or less and capable of being subjected to three-dimensional forming and chemical strengthening.

CITATION LIST

Patent Literature

Patent Literature 1: WO 2014/167894 A1
Patent Literature 2: JP 2013-520385 A

SUMMARY OF INVENTION

Technical Problem

When a glass sheet is bend-formed, thermal stress is generated by heating the glass sheet, which sometimes causes cracking of the glass sheet. Furthermore, the shape of the formed glass sheet sometimes varies.

For example, the glass described in Patent Literature 2 is capable of being subjected to three-dimensional forming, but there has been a tendency of easy cracking during the bend forming. In recent years, high definition of displays has been achieved, or functions such as waterproofness have become to be demanded. Therefore, forming precision higher than that in the conventional case has been demanded. Together with the easy cracking tendency, precise forming ability has been insufficient for the previously invented glass.

An object of the present invention is to provide a chemically strengthened glass which solves such problems of the prior art.

Solution to Problem

The present inventors have studied bend forming of glass sheets, and have found characteristics and composition of a glass sheet which is less likely to be scratched and less likely to cause problems such as cracking during the bend forming and less likely to cause poor precision.

The present invention has been made based on the above findings, and one aspect of the glass for chemical strengthening of the present invention has a Young's modulus E of 70 GPa or more, and satisfies $X_1+X_2+X_3$ being 1760 or less, in which $X_1$ is a numerical value equivalent to a value [unit: kPa/° C.] obtained by multiplying the Young's modulus E by an average coefficient α of thermal expansion at 50° C. to 350° C., $X_2$ is a numeral value equivalent to a value of a temperature Tf [unit: ° C.] at which a viscosity of the glass reaches 100 MPa·s, and $X_3$ is a numerical value equivalent to a value of a difference [unit: $10^5$ Pa·s] between the viscosity (100 MPa·s) at the Tf and a viscosity $\eta_{+10}$ at a temperature 10° C. higher than the Tf.

One aspect of the glass for chemical strengthening of the present invention may be a lithium aluminosilicate glass.

One aspect of the glass for chemical strengthening of the present invention may include, in mass percentage on the basis of oxides: $SiO_2$ in an amount of 56 to 73%; $Al_2O_3$ in an amount of 10 to 24%; $B_2O_3$ in an amount of 0 to 6%; $P_2O_5$ in an amount of 0 to 6%; $Li_2O$ in an amount of 2 to 7%; $Na_2O$ in an amount of 3 to 11%; $K_2O$ in an amount of 0 to 5%; MgO in an amount of 0 to 8%; CaO in an amount of 0 to 2%; SrO in an amount of 0 to 5%; BaO in an amount of 0 to 5%; ZnO in an amount of 0 to 5%; $TiO_2$ in an amount of 0 to 2%; and $ZrO_2$ in an amount of 0 to 4%.

Another aspect of the glass for chemical strengthening has a Young's modulus E of 80 to 90 GPa and an average coefficient α of thermal expansion at 50° C. to 350° C. of $60 \times 10^{-7}$ to $85 \times 10^{-7}$/° C., and includes, in mass percentage on the basis of oxides: $SiO_2$ in an amount of 56 to 73%; $Al_2O_3$ in an amount of 10 to 24%; $B_2O_3$ in an amount of 0 to 6%; $P_2O_5$ in an amount of 0 to 6%; $Li_2O$ in an amount of 2 to 7%; $Na_2O$ in an amount of 3 to 11%; $K_2O$ in an amount of 0 to 5%; MgO in an amount of 0 to 8%; CaO in an amount of 0 to 2%; SrO in an amount of 0 to 5%; BaO in an amount of 0 to 5%; ZnO in an amount of 0 to 5%; $TiO_2$ in an amount of 0 to 2%; and $ZrO_2$ in an amount of 0 to 4%.

One aspect of the glass for chemical strengthening of the present invention may have the Tf of 780° C. or less.

One aspect of the glass for chemical strengthening of the present invention may show no crystallization peak or have a crystallization peak temperature being higher than a softening temperature of the glass, as measured by differential scanning calorimetry from room temperature to 1000° C. at a temperature rising rate of 10° C./min.

One aspect of the glass for chemical strengthening of the present invention may have a thermal conductivity at 500° C. of 1.3 W/mK or more.

One aspect of the glass for chemical strengthening of the present invention may have a mirror constant of 2.0 MPa·m$^{1/2}$ or more.

One aspect of the glass for chemical strengthening of the present invention may have an mirror constant of the annealed glass of 2.0 MPa·m$^{1/2}$ or more, the mirror constant of the annealed glass being obtained by measuring a mirror constant after the glass is held at a temperature 30° C. higher than a glass transition temperature Tg for 1 hour, followed by annealing the glass to room temperature at a cooling rate of 1° C./min.

One aspect of the glass for chemical strengthening of the present invention may have a softening temperature of 820° C. or less.

A method for manufacturing a chemically strengthened glass in the present invention includes heating and bend-forming the glass for chemical strengthening according to any one of the above items on a bend forming mold, followed by chemical strengthening.

In one aspect of the method for manufacturing a chemically strengthened glass of the present invention, the bend forming may be performed by a press forming method.

The chemically strengthened glass in the present invention is a chemically strengthened glass having a curved surface shape by bend-forming, and having a base composition including, in mass percentage on the basis of oxides: $SiO_2$ in an amount of 56 to 73%; $Al_2O_3$ in an amount of 10 to 24%; $B_2O_3$ in an amount of 0 to 6%; $P_2O_5$ in an amount of 0 to 6%; $Li_2O$ in an amount of 2 to 7%; $Na_2O$ in an amount of 3 to 11%; $K_2O$ in an amount of 0 to 5%; MgO in an amount of 0 to 8%; CaO in an amount of 0 to 2%; SrO in an amount of 0 to 5%; BaO in an amount of 0 to 5%; ZnO in an amount of 0 to 5%; $TiO_2$ in an amount of 0 to 2%; and $ZrO_2$ in an amount of 0 to 4%, in which devitrification is not observed.

Advantageous Effects of the Invention

According to a glass for chemical strengthening of the present invention, a bend-formed high-strength chemically strengthened glass is obtained.

DESCRIPTION OF EMBODIMENTS

Figure 1:
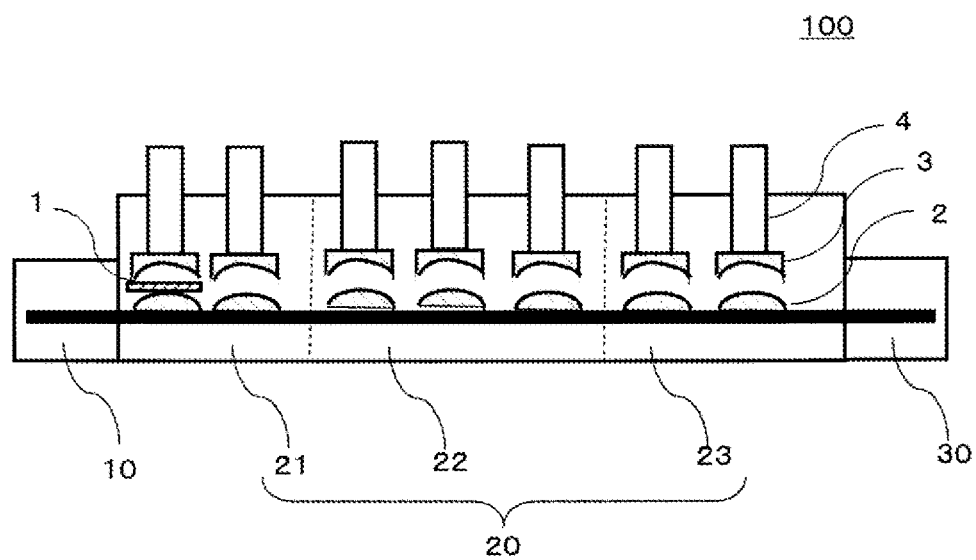
FIG. 1 is a schematic view of a device used for bend forming of a glass sheet as one example.

A glass for chemical strengthening and chemically strengthened glass in the present invention are described below.

In the present description, the "chemically strengthened glass" means a glass after having been subjected to a chemical strengthening treatment. On the other hand, the "glass for chemical strengthening" means a glass before being subjected to a chemical strengthening treatment. The "glass for chemical strengthening" is a glass capable of being chemically strengthened.

In the present description, the "base composition of the chemically strengthened glass" is a glass composition of the glass for chemical strengthening. In the chemically strengthened glass, a compressive stress layer due to ion exchange is usually formed in a glass surface layer. Therefore, the glass composition of a portion not ion-exchanged matches the base composition of the chemically strengthened glass.

In the present description, "A to B" indicating a numerical range means equal to or more than the lower limit B and equal to or less than the upper limit A.

In the present description, the "mass percentage" has the same meaning as the "weight percentage".

[First Aspect of Glass for Chemical Strengthening]

First, a first aspect of the glass for chemical strengthening is described.

The first aspect is directed to a glass for chemical strengthening having a Young's modulus of 70 GPa or more.

In the glass for chemical strengthening of this aspect, $X_1+X_2+X_3$ is 1760 or less, wherein $X_1$ is a numerical value equivalent to a value [unit: $kPa/°C.$] obtained by multiplying the Young's modulus E by an average coefficient α of thermal expansion at 50° C. to 350° C., $X_2$ is a numerical value equivalent to a value of a temperature Tf [unit: ° C.] at which the viscosity of the glass reaches 100 MPa·s, and $X_3$ is a numerical value equivalent to a value of the difference [unit: $10^5$ Pa·s] between the viscosity (100 MPa·s) at the Tf and a viscosity $\eta_{+10}$ at a temperature 10° C. higher than the Tf.

<Young's Modulus E>

In this aspect, the glass for chemical strengthening has a Young's modulus E of 70 GPa or more. The glass having a Young's modulus E of 70 GPa or more is less likely to be scratched. The Young's modulus E is preferably 78 GPa or more, and more preferably 80 GPa or more. In addition, when the Young's modulus E is too high, the glass becomes easily cracked during bend forming described later. Therefore, the Young's modulus E is preferably 90 GPa or less, and more preferably 85 GPa or less. The Young's modulus E can be measured, for example, by an ultrasonic pulse method.

<$X_1+X_2+X_3$>

In the glass for chemical strengthening of this aspect, $X_1+X_2+X_3$ is small, wherein $X_1$ is the numerical value equivalent to the value [unit: $kPa/°C.$] obtained by multiplying the Young's modulus E by the average coefficient α of thermal expansion at 50° C. to 350° C., $X_2$ is the numerical value equivalent to the value of the temperature Tf [unit: ° C.] at which the viscosity of the glass reaches 100 MPa·s, and $X_3$ is the numerical value equivalent to the value of the difference [unit: $10^5$ Pa·s] between the viscosity (100 MPa·s) at the Tf and the viscosity $\eta_{+10}$ at the temperature 10° C. higher than the Tf.

The numerical values $X_1$ to $X_3$ have technical meaning in the degree of the respective numerical values, and by comparing these numerical values for a certain glass and another glass, it can be determined whether the glass is suitable for the bend forming or not.

As described in detail below, the glass having the smaller values for all of $X_1$ to $X_3$ tends to be more suitable for 3D forming. The present inventors have studied various glasses, and as a result, it has been experimentally found that the smaller the total value $X_1+X_2+X_3$ of the glass is, the more the glass is suitable for the bend forming.

For example, the glass having an extremely small coefficient of thermal expansion is small in the $X_1$, and is preferred because cracking during the bending is less likely to occur. However, in general, a glass having a small coefficient of thermal expansion is high in viscosity of the glass, and the forming temperature Tf tends to be high, and thus, the $X_2$ becomes large. Accordingly, it is important to decrease these numerical values with good balance.

In the glass of this aspect, $X_1+X_2+X_3$ is 1760 or less, preferably 1670 or less, more preferably 1650 or less, and still more preferably 1645 or less. The smaller $X_1+X_2+X_3$ is preferred in terms of excellent formability. However, in the glass for chemical strengthening, it is usually 1000 or more.

The numerical value $X_1$ is equivalent to the value [unit: $kPa/°C.$] obtained by multiplying the Young's modulus E by the average coefficient α of thermal expansion at 50° C. to 350° C. Therefore, the glass having a large Young's modulus and a large coefficient of thermal expansion is large in the $X_1$. In the glass having a large numerical value $X_1$, cracking of a glass sheet caused by contact between a forming mold and the glass sheet easily occurs, and the efficiency of the bend forming tends to be deteriorated.

The $X_1$ of an ordinary glass is approximately 900 or less. However, in order to avoid the cracking during the bend forming, it is preferably 620 or less, and more preferably 600 or less. The smaller $X_1$ is preferred because the glass is less likely to be cracked. However, it is usually 350 or more.

In order to achieve cracking resistance during the forming, the average coefficient α of thermal expansion of the glass sheet is preferably $85\times10^{-7}/°$ C. or less, more preferably $82\times10^{-7}/°$ C. or less, still more preferably $80\times10^{-7}/°$ C. or less, and particularly preferably $75\times10^{-7}/°$ C. or less. However, the glass having a small coefficient of thermal expansion has a tendency of poor glass production efficiency because of its high melting temperature or the like. From the standpoint of melting efficiency, the coefficient of thermal expansion is preferably $50\times10^{-7}/°$ C. or more, more preferably $60\times10^{-7}/°$ C. or more, and still more preferably $70\times10^{-7}/°$ C. or more.

The numerical value $X_2$ is equivalent to the value of the temperature Tf [unit: ° C.] at which the viscosity of the glass reaches 100 MPa·s. Usually, the bend forming of the glass is preferably performed at a temperature around the temperature Tf at which the viscosity of the glass reaches 100 MPa·s. Therefore, the larger the $X_2$ of the glass is, the higher the temperature suitable for the bend forming is. Accordingly, in the glass having the large $X_2$, the efficiency of the bend forming tends to be deteriorated, because energy necessary for the bend forming is large, the forming mold and the like used in the bending are easy to be deteriorated, and the like.

The $X_2$ of an ordinary glass is approximately 900 or less. However, in order to increase the efficiency of the bend forming, it is preferably 780 or less, and more preferably 750 or less. The smaller $X_2$ is preferred because the bend forming can be performed at a lower temperature. However, it is usually 550 or more.

That is, the Tf is preferably 780° C. or less, more preferably 750° C. or less, and still more preferably 710° C. or less, and in an ordinary glass for chemical strengthening, it is 550° C. or less.

The temperature Tf can be measured using a beam bending method (JIS R3103-2:2001).

The numeral value $X_3$ is equivalent to the value of the difference [unit: $10^5$ Pa·s] between the viscosity (100 MPa·s) at the Tf and the viscosity $\eta_{+10}$ at the temperature 10° C. higher than the Tf. Therefore, the larger the $X_3$ of the glass is, the larger a viscosity change near the forming temperature is. Accordingly, the larger the $X_3$ of the glass is, the more the defects such as insufficient bend forming and excessive deformation due to a slight temperature change during the bend forming tend to be easily generated. In order to avoid such defects, the numeral value $X_3$ is preferably 380 or less, more preferably 360 or less, and still more preferably 350 or less. The smaller the $X_3$ is, the more the defects as described above can be avoided. However, in an ordinary glass, it is 100 or more.

The viscosity $\eta_{+10}$ at the temperature 10° C. higher than the Tf can be measured using the beam bending method (JIS R3103-2:2001).

<Other Properties>

In the glass for chemical strengthening of this aspect, the softening temperature is preferably 820° C. or less, more preferably 800° C. or less, and still more preferably 780° C. or less. This is because the higher the softening temperature of the glass is, the higher the heat treatment temperature in the bend forming increases, resulting in an increase in energy consumption, and in addition thereto, also resulting in an increase in a load of equipment. In order to lower the bend-forming temperature, the lower softening temperature is preferred. However, in the glass having an excessively high softening temperature, stress introduced during the chemical strengthening treatment is easily relaxed, and the strength tends to be easily decreased. Therefore, the softening temperature of the glass for chemical strengthening of the present invention is preferably 700° C. or more, more preferably 720° C. or more, and still more preferably 740° C. or more.

In order to reduce temperature distribution in the inside of the glass sheet during the forming, the thermal conductivity $\sigma_{500}$ at 500° C. of the glass for chemical strengthening of this aspect is preferably 1.3 W/mK or more, more preferably 1.34 W/mK or more, still more preferably 1.38 W/mK or more, 1.42 W/mK or more, 1.46 W/mK or more, and 1.5 W/mK or more.

The thermal conductivity $\sigma_{20}$ at room temperature is preferably 0.9 W/mK or more, more preferably 1.0 W/mK or more, and still more preferably 1.1 W/mK or more.

On the other hand, in order to make it possible to form a part of the glass sheet by local heating, the σ500 is preferably 2.0 W/mK or less, and the $\sigma_{20}$ is preferably 3.0 W/mK or less.

The thermal conductivity $\sigma_{20}$ can be measured by a laser flash method or the like.

In the glass for chemical strengthening, scattering of fragments caused by cracking of the glass can be avoided by adjusting the mirror constant to a proper range, thereby being able to improve safety. The mirror constant is described below.

Figure 2:
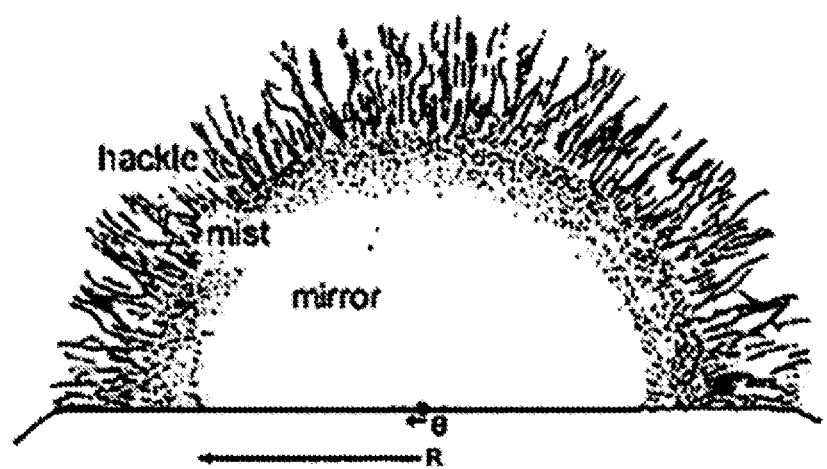
FIG. 2 is a diagram schematically showing how a periphery of a fracture starting point is cracked in the case where a glass having no residual stress inside is fractured by uniform tensile stress.

When the glass is cracked, the shape of a fractured surface thereof varies depending on a magnitude of stress. FIG. 2 shows schematically how a periphery of a fracture starting point is cracked in the case where the glass having no residual stress inside, that is, the glass not subjected to the chemical strengthening, is fractured by uniform tensile stress (see ASTM C-1678-10).

In FIG. 2, a smooth surface called a mirror surface is formed in the periphery of the fracture starting point indicated by a black circle. In addition, a somewhat rough interface called "mist" is formed therearound, and a rough surface called "hackle" is formed therearound. In FIG. 2, when the distance from the fracture starting point indicated by the black circle to a boundary between the mirror surface and the mist surface is defined as R, and the stress which has caused fracture is defined as s, it is known that s is proportional to the reciprocal of the square root of R, and the proportional constant thereof is the mirror constant A. That is, the relationship shown by the following formula is obtained.

$$s = A/R^{1/2}$$

The mirror constant A is experimentally determined by measuring the stress s at the time of fracture and the distance R from the fracture starting point to the boundary between the mirror surface and the mist surface.

The mirror constant depends on a glass composition and a fictive temperature. The fictive temperature is an index showing disorder of a glass structure, and thus, when the fictive temperature is different, the glass structure is different, physical properties such as viscosity and refractive index vary even in the same glass composition. The relationship between the mirror constant and the glass structure is described in detail later. In addition, the lower the fictive temperature of the glass is, the larger the mirror constant is. Further, the slower the cooling rate after heating the glass is, the lower the fictive temperature is. Then, the mirror constant becomes largest when annealing is sufficiently performed so that the fictive temperature is equal to or lower than the glass transition temperature Tg (hereinafter also referred to simply as Tg), and in the case of rapid cooling, the mirror constant becomes small.

In the glass for chemical strengthening, when the mirror constant A is 2.0 MPa·m$^{1/2}$ or more, the number of fragments when cracked is small, and therefore, the fragments are less likely to be scattered even when internal tensile stress, CT is increased by the strengthening, thereby achieving high safety, which is therefore preferred. In this case, surface compressive stress CS (hereinafter also referred to simply as CS) after the chemical strengthening can be increased. The chemically strengthened glass having large CS is less likely to be cracked, because it has an effect of narrowing a flaw by the surface compressive stress, even when the flaw is formed on a surface thereof.

The mirror constant A of the glass for chemical strengthening of this aspect is more preferably 2.1 MPa·m$^{1/2}$ or more, and still more preferably 2.3 MPa·m$^{1/2}$ or more.

In the present description, the mirror constant which is measured after the glass is held at a temperature 30° C. higher than the Tg for 1 hour, and then, the glass is precisely annealed to room temperature at a cooling rate of 1° C./min is called the "mirror constant of the annealed glass". The mirror constant of the glass depends on the glass composition and the fictive temperature, and the fictive temperature depends on thermal history. Therefore, the mirror constant of the annealed glass can also be said to be a characteristic value of the glass from which an influence of the thermal history is removed.

The mirror constant of the annealed glass of the glass for chemical strengthening of this aspect is preferably 2.0 MPa·m$^{1/2}$ or more, more preferably 2.1 MPa·m$^{1/2}$ or more, and still more preferably 2.3 MPa·m$^{1/2}$ or more.

<Glass Composition>

In order to obtain high strength by the chemical strengthening, the glass for chemical strengthening of this aspect is preferably has the glass composition suitable for ion exchange.

The chemical strengthening treatment is usually performed by an ion exchange treatment in which alkali metal ions having smaller ionic radius in the glass are substituted with alkali metal ions having larger ionic radius in a glass surface. By the ion exchange, the alkali metal ions having larger ionic radius are restrained in places where the alkali metal ions having smaller ionic radius have been present, whereby compressive stress is generated in portions where the ion exchange has occurred. By generation of the compressive stress in the glass surface, the glass surface becomes less likely to be scratched, and even when scratched, the glass becomes less likely to be cracked.

In this aspect, the glass for chemical strengthening is preferably a lithium aluminosilicate glass. The lithium aluminosilicate glass contains lithium ions having small ionic radius, and therefore, the chemical strengthening can be performed using a sodium salt or a potassium salt. In addition, the lithium ions are easily moved by the ion exchange treatment. It is therefore easy to increase the depth of compressive stress layer DOL (hereinafter also referred to as simply as DOL). Furthermore, the surface compressive stress (CS) and the DOL can be properly adjusted by performing the chemical strengthening using the sodium salt or the potassium salt.

More specifically, preferred is a glass composition including, in mass percentage on the basis of oxides: $SiO_2$ in an amount of 56 to 73%; $Al_2O_3$ in an amount of 10 to 24%; $B_2O_3$ in an amount of 0 to 6%; $P_2O_5$ in an amount of 0 to 6%; $Li_2O$ in an amount of 2 to 7%; $Na_2O$ in an amount of 3 to 11%; $K_2O$ in an amount of 0 to 5%; MgO in an amount of 0 to 8%; CaO in an amount of 0 to 2%; SrO in an amount of 0 to 5%; BaO in an amount of 0 to 5%; ZnO in an amount of 0 to 5%; $TiO_2$ in an amount of 0 to 2%; and $ZrO_2$ in an amount of 0 to 4%.

In addition, more preferred is a glass composition including, in mass percentage on the basis of oxides: $SiO_2$ in an amount of 63 to 72%; $Al_2O_3$ in an amount of 11 to 16%; $B_2O_3$ in an amount of 0 to 5%; $P_2O_5$ in an amount of 0 to 4%; $Li_2O$ in an amount of 2 to 5%; $Na_2O$ in an amount of 4 to 8%; $K_2O$ in an amount of 0 to 2%; MgO in an amount of 1 to 6.5%; CaO in an amount of 0 to 2%; SrO in an amount of 0 to 4%; BaO in an amount of 0 to 4%; ZnO in an amount of 0 to 2%; $TiO_2$ in an amount of 0 to 2%; and $ZrO_2$ in an amount of 0 to 3%.

A crystal is easily precipitated in the lithium aluminosilicate glass, and the crystal is sometimes precipitated by the heat treatment for performing the bend forming. The crystal precipitated in the lithium aluminosilicate glass is, for example, spodumene.

Lithium silicate, a quartz solid solution or the like are also sometimes precipitated, depending on the glass composition. Such crystals are likely to become defects. It is therefore preferred to avoid the precipitation thereof as much as possible.

In order to avoid the precipitation of the crystals during bend-forming, it is preferred that the crystallization peak temperature of the glass for chemical strengthening, which is measured by the following measuring method, is higher than the softening temperature of the glass. In addition, it is more preferred that no crystallization peak is observed.

(Measuring Method)

About 70 mg of the glass is crushed, and ground with an agate mortar. Measurement is made from room temperature to 1000° C. at a temperature rising rate of 10° C./min using a differential scanning calorimeter (DSC).

In addition, when the crystallization peak is observed by the above measuring method, in the case where the crystal precipitated when the glass is held at the temperature is spodumene, the crystal largely grows during heating for the bend forming to easily cause a defect. This is because spodumene has a fast crystal growth rate.

Thus, in the case of the glass composition which easily leads to precipitation of the spodumene, particularly, it is preferred that the crystal is less likely to be formed. Furthermore, the thermal history which the glass has received is preferably thermal history by which the crystal is less likely to grow. This is because even in the same glass composition, the longer the time for which the glass has been exposed to a crystal nucleus forming temperature range is, the more easily the crystal is formed. For example, the glass obtained by being melted at a high temperature and thereafter cooled is sometimes easily recrystallized by being reheated for the purpose of the bend forming or the like.

Respective components of the preferred glass composition described above are described below.

$SiO_2$ is a component constituting a framework of the glass. Furthermore, $SiO_2$ is a component enhancing chemical durability and also reducing the generation of cracks when flaws (indentations) are formed on the glass surface. In order to avoid the generation of cracks, the content of $SiO_2$ is preferably 56% or more, more preferably 63% or more, still more preferably 65% or more, and particularly preferably 68% or more. On the other hand, in order to improve meltability in the glass production process, the content of $SiO_2$ is preferably 73% or less, more preferably 72% or less, still more preferably 70% or less, and particularly preferably 68% or less.

$Al_2O_3$ is a component effective for improving ion exchange performance during the chemical strengthening treatment, and for increasing the surface compressive stress CS after the chemical strengthening. In addition, $Al_2O_3$ has an effect of improving the mirror constant A of the glass. Furthermore, $Al_2O_3$ is a component increasing the Tg of the glass, and also increasing the Young's modulus. In order to enhance chemical strengthening properties, the content of $Al_2O_3$ is preferably 10% or more, and more preferably 11% or more. In addition, in order to increase the mirror constant, it is more preferably 13% or more. On the other hand, when the content of $Al_2O_3$ is too large, acid resistance of the glass is deteriorated, or the devitrification temperature is liable to increase. Therefore, the content of $Al_2O_3$ is preferably 24% or less, more preferably 20% or less, and still more preferably 18% or less.

In addition, $Al_2O_3$ is a constituent component of the lithium aluminosilicate crystal. In order to avoid the crystal precipitation during the bend forming, the content of $Al_2O_3$ is preferably 16% or less, more preferably 14% or less, and still more preferably 13% or less.

$B_2O_3$ is a component improving the meltability of the glass. In addition, it is a component improving chipping resistance of the glass. $B_2O_3$ is not essential, but when $B_2O_3$ is contained, the content of $B_2O_3$ is preferably 0.5% or more, more preferably 1% or more, and still more preferably 2% or more, in order to improve the meltability. On the other hand, when the content of $B_2O_3$ is too large, striae are generated during melting, and the quality of the chemically strengthened glass is easily deteriorated. Therefore, the content of $B_2O_3$ is preferably 6% or less, more preferably 5% or less, still more preferably 3% or less, and particularly preferably 1% or less. In order to enhance the acid resistance, it is preferred that $B_2O_3$ is not substantially contained.

The term "is not substantially contained" used in the present description means that the component is not contained excluding the case where the component is contained as inevitable impurities contained in raw materials and the like, that is, means that the component is not intentionally contained. Specifically, it means that the content in the glass composition is less than 0.1%.

$P_2O_5$ is a component improving the ion exchange performance during the chemical strengthening treatment and the chipping resistance. $P_2O_5$ is not essential, but when $P_2O_5$ is contained, the content of $P_2O_5$ is preferably 0.5% or more, more preferably 1% or more, and still more preferably 2% or more. On the other hand, when the content of $P_2O_5$ is too large, the acid resistance is remarkably deteriorated. Then, the content of $P_2O_5$ is preferably 6% or less, more preferably 4% or less, still more preferably 3% or less, yet still more preferably 2% or less, and particularly preferably 1% or less. In order to enhance the acid resistance, it is preferred that $P_2O_5$ is not substantially contained.

$Li_2O$ is a component forming a surface compressive stress layer by the chemical strengthening treatment with a sodium salt such as sodium nitrate, and an essential component of the lithium aluminosilicate glass.

When the content of $Li_2O$ is 2% or more, the compressive stress generated by the chemical strengthening increases, which is therefore preferred. It is more preferably 3% or more, and still more preferably 5% or more. On the other hand, when the content of $Li_2O$ is too large, weather resistance is deteriorated. It is therefore preferably 7% or less. In addition, in order to avoid the crystal precipitation during the bend forming, it is preferably 6% or less, and more preferably 5% or less.

$Na_2O$ is a component contributing to the formation of the surface compressive stress layer in the chemical strengthening treatment using the potassium salt and improving the meltability of the glass.

In order to obtain the effect thereof, the content of $Na_2O$ is preferably 2% or more, more preferably 3% or more, and still more preferably 4% or more. On the other hand, in order to avoid a decrease in the surface compressive stress CS due to the sodium salt, it is preferably 11% or less, more preferably 9% or less, still more preferably 8% or less, and particularly preferably 6% or less.

$K_2O$ may be contained in order to improve the meltability of the glass. When $K_2O$ is contained, the content of $K_2O$ is preferably 0.5% or more, and more preferably 1% or more. On the other hand, in order not to deteriorate breaking resistance of the chemically strengthened glass, the content of $K_2O$ is preferably 5% or less, more preferably 3% or less, and still more preferably 2% or less.

MgO is not essential, but is preferably contained in order to increase the surface compressive stress CS of the chemically strengthened glass. In addition, MgO has an effect of increasing the mirror constant A. Therefore, the content of MgO is preferably 1% or more, more preferably 2% or more, and still more preferably 3% or more. On the other hand, in order to avoid devitrification during the glass melting, the content of MgO is preferably 8% or less, more preferably 6.5% or less, and still more preferably 5% or less.

CaO is not essential, but is a component improving the meltability of the glass, has an effect of increasing the mirror constant A, and may be contained. When CaO is contained, the content of CaO is preferably 0.1% or more, more preferably 0.15% or more, still more preferably 0.3% or more, and particularly preferably 1% or more. On the other hand, when the CaO content is large, the ion exchange performance during the chemical strengthening treatment may be deteriorated. Therefore, it is preferably 2% or less, and more preferably 1% or less, and it is still more preferred that CaO is not substantially contained.

SrO is not essential, but is a component improving the meltability of the glass, has an effect of increasing the mirror constant A, and may be contained. When SrO is contained, the content of SrO is preferably 0.1% or more, more preferably 0.15% or more, still more preferably 0.3% or more, and particularly preferably 1% or more. On the other hand, in order to enhance the ion exchange performance during the chemical strengthening treatment, the content of SrO is preferably 5% or less, more preferably 4% or less, and still more preferably 2% or less, and it is particularly preferred that SrO is not substantially contained.

BaO is not essential, but is a component improving the meltability of the glass, has an effect of increasing the mirror constant A, and may be contained. When BaO is contained, the content of BaO is preferably 0.1% or more, more preferably 0.15% or more, still more preferably 0.3% or more, and particularly preferably 1% or more. On the other hand, in order to enhance the ion exchange performance during the chemical strengthening treatment, the content of BaO is preferably 5% or less, more preferably 4% or less, and still more preferably 2% or less, and it is still more preferred that BaO is not substantially contained.

ZnO is a component improving the meltability of the glass, and may be contained. When ZnO is contained, the content of ZnO is preferably 0.25% or more, and more preferably 0.5% or more. On the other hand, when the content of ZnO is 5% or less, the weather resistance of the glass can be enhanced, which is therefore preferred. The content of ZnO is more preferably 2% or less, and still more preferably 1% or less, and it is particularly preferred that ZnO is not substantially contained.

TiO$_2$ is a component reducing changes in color tone of the glass caused by solarization, and may be contained. When TiO$_2$ is contained, the content of TiO$_2$ is preferably 0.03% or more, more preferably 0.1% or more, still more preferably 0.2% or more, and particularly preferably 0.3% or more. On the other hand, in order to avoid the devitrification during the melting, it is preferably 2% or less, more preferably 0.5% or less, and still more preferably 0.2% or less.

ZrO$_2$ is a component increasing the surface compressive stress CS by the ion exchange during the chemical strengthening treatment, and may be contained. When ZrO$_2$ is contained, the content thereof is preferably 0.5% or more, more preferably 0.75% or more, and still more preferably 1% or more. On the other hand, in order to avoid the devitrification during the melting, thereby enhancing the quality of the chemically strengthened glass, it is preferably 4% or less, more preferably 3% or less, and particularly preferably 2% or less.

Fe$_2$O$_3$ has an effect of improving the meltability of the glass, because Fe$_2$O$_3$ absorbs heat rays, and when the glass is mass-produced using a large melting furnace, Fe$_2$O$_3$ is preferably contained. The content thereof in that case is preferably 0.002% or more, more preferably 0.005% or more, still more preferably 0.007% or more, and particularly preferably 0.01% or more. On the other hand, when Fe$_2$O$_3$ is excessively contained, coloration occurs. Therefore, in order to enhance transparency of the glass, the content thereof is preferably 0.3% or less, more preferably 0.04% or less, still more preferably 0.025% or less, and particularly preferably 0.015% or less.

Here, all iron oxides in the glass are described as Fe$_2$O$_3$, but actually, Fe(III) in an oxidized state and Fe(II) in a reduced state usually coexist. Of these, Fe(III) generates yellow coloration, and Fe(II) generates blue coloration. Green coloration is generated in the glass, depending on the balance between both.

Y$_2$O$_3$, La$_2$O$_3$ and Nb$_2$O$_5$ may be contained. When these are contained, the total content of these components is preferably 0.5% or more, more preferably 1% or more, still more preferably 1.5% or more, particularly preferably 2% or more, and most preferably 2.5% or more. On the other hand, when the content of Y$_2$O$_3$, La$_2$O$_3$ and Nb$_2$O$_5$ is too large, the glass may be easily devitrified during the melting, and the quality of the chemically strengthened glass may be deteriorated. Therefore, the total content thereof is preferably 8% or less. The total content of Y$_2$O$_3$, La$_2$O$_3$ and Nb$_2$O$_5$ is more preferably 6% or less, still more preferably 5% or less, particularly preferably 4% or less, and most preferably 3% or less.

Ta$_2$O$_5$ and Gd$_2$O$_3$ may be contained in small amounts in order to improve the breaking resistance of the chemically strengthened glass, but they increase refractive index and reflectivity. Therefore, the content thereof is preferably 1% or less, and more preferably 0.5% or less, and it is still more preferred that they are not contained.

Furthermore, when the glass is colored, coloring components may be added in such a range that the achievement of desired chemical strengthening properties is not impaired. Preferred examples of the coloring components include Co$_3$O$_4$, MnO$_2$, NiO, CuO, Cr$_2$O$_3$, V$_2$O$_5$, Bi$_2$O$_3$, SeO$_2$, CeO$_2$, Er$_2$O$_3$, Nd$_2$O$_3$ and the like.

When the total content of the coloring components is 7% or less, a problem such as devitrification is less likely to occur, which is therefore preferred. The content thereof is preferably 5% or less, more preferably 3% or less, and still more preferably 1% or less. When visible light transmittance of the glass is prioritized, it is preferred that those components are not substantially contained.

SO$_3$, a chloride, a fluoride or the like may be appropriately contained as a fining agent during the melting of the glass. It is preferred that As$_2$O$_3$ is not contained, because of its high environmental load. When Sb$_2$O$_3$ is contained, the content thereof is preferably 0.3% or less, and more preferably 0.1% or less, and it is most preferred that Sb$_2$O$_3$ is not contained.

The glass having a large β-OH value as an index of moisture content in the glass tends to have low Tf and to be easily bent. Therefore, the β-OH value is preferably 0.1 mm$^{-1}$ or more, more preferably 0.15 mm$^{-1}$ or more, still more preferably 0.2 mm$^{-1}$ or more, particularly preferably 0.22 mm$^{-1}$ or more, and most preferably 0.25 mm$^{-1}$ or more.

On the other hand, from the viewpoint of improvement in strength by the chemical strengthening of the glass, when the β-OH value of the glass increases, the value of the surface compressive stress CS after the chemical strengthening treatment decreases, and it becomes difficult to improve the strength. Therefore, the β-OH value is preferably 0.5 mm$^{-1}$ or less, more preferably 0.4 mm$^{-1}$ or less, and still more preferably 0.3 mm$^{-1}$ or less.

The "β-OH value" as used herein is determined by the formula (1) from the minimum transmittance T$_2$ (%) near a hydroxyl group absorption wavelength of 3570 cm$^{-1}$, measured by FT-IR method, the transmittance T$_1$ (%) at a reference wavelength of 4000 cm$^{-1}$ and the thickness t (unit: mm) of the glass sheet.

$$\beta\text{-OH value}=(1/t)\log_{10}(T_1/T_2) \tag{1}$$

The β-OH value can be controlled by the moisture content contained in the glass raw materials or melting conditions.

<Method for Manufacturing Glass for Chemical Strengthening>

As a method for manufacturing the glass for chemical strengthening in this aspect, a conventional method can be appropriately used. For example, glass raw materials are appropriately prepared, heated at about 1500 to 1700° C. to melt them, followed by homogenizing by defoaming, stirring and the like, and thereafter, it is formed into a sheet shape by a well-known float process, downdraw process (such as a fusion process), press process or the like. Alternatively, the glass sheet may be produced by casting and forming into a block shape and cutting it to a desired size after annealing.

The glass for chemical strengthening of this aspect is subjected to polishing as necessary. In addition, it is also possible to treat a main surface of the glass for chemical strengthening with a fluorine agent or the like in addition to or in place of the polishing. When stable production of the glass for chemical strengthening of the present invention is taken into consideration, the float process or the downdraw process is preferred as the method for forming into the sheet shape. In particular, in order to manufacture the large glass for chemical strengthening, the float process is preferred. According to the float process, the fictive temperature decreases to easily increase the mirror constant.

The glass sheet for chemical strengthening of this aspect is cut to a size depending on its application. For example, when the glass sheet is used as a display portion of a mobile phone, various window glasses or the like, it is generally cut into a rectangular shape. However, there is no problem even when cut into another shape such as a circular or polygonal shape, and hole drilling may be performed thereon.

In addition, the glass sheet for chemical strengthening of this aspect has a thickness depending on its application. For example, when the glass sheet is used as a cover glass of the display portion of the mobile phone or the like, the thickness is preferably 2.0 mm or less, more preferably 1.0 mm or less, and still more preferably 0.75 mm or less.

<Bend Forming>

The glass for chemical strengthening of this aspect may be subjected to the bend forming. After the glass for chemical strengthening of this aspect is bend-formed, the chemical strengthening treatment described later is performed, thereby forming the bend-formed high-strength chemically strengthened glass.

An example of the bend forming of the glass sheet is described below, but the bend forming performed on the glass for chemical strengthening of this aspect is not limited thereto.

When the glass sheet is bend-formed, usually, the flat glass sheet is cut, followed by subjecting to processing such as chamfering, and thereafter, the glass sheet is bend-formed.

As a bend forming method, any method may be selected from existing methods such as a self-weight forming method, a vacuum forming method and a press forming method. In addition, two or more kinds of bend-forming methods may be used together.

The self-weight forming method is a method of placing a glass sheet on a forming mold, thereafter heating the glass sheet, and fitting it to the forming mold by gravity, thereby bend-forming it into a predetermined shape.

The vacuum forming method is a method of placing a glass sheet on a forming mold, sealing a periphery of the glass sheet, and thereafter reducing a pressure in a space between the forming mold and the glass sheet to give a differential pressure to front and back surfaces of the glass sheet, thereby performing bend forming. In this case, the upper surface side of the glass sheet may be supplementarily pressurized.

The press forming method is a method of placing a glass sheet between forming molds (lower mold and upper mold), heating the glass sheet, and adding a press load between the upper and lower forming molds, thereby bend-forming it into a predetermined shape.

FIG. 1 shows an example of a bend forming apparatus by the press forming method. In order to describe the example of the bend forming method of the glass for chemical strengthening of this aspect, first, an example of the bend forming method of the glass sheet is described using FIG. 1.

A bend forming apparatus 100 shown in FIG. 1 includes an atmosphere replacing chamber 10, a forming chamber 20 and an air replacing chamber 30. The forming chamber 20 includes a heating zone 21, a forming zone 22 and a cooling zone 23, and forming molds 2 and 3 and a press 4 are provided in each zone. The material of the forming molds 2 and 3 is, for example, carbon. In order to prevent deterioration of the forming molds 2 and 3, the inside of the forming chamber 20 is filled with an inert gas such as nitrogen. In order to keep the atmosphere in the forming chamber 20 inert, the atmosphere replacing chamber 10 and the air replacing chamber 30 are provided at both ends of the forming chamber 20.

First, a glass sheet 1 is inserted in the atmosphere replacing chamber 10. Then, the glass sheet 1 is transferred to the heating zone 21 of the forming chamber 20 by a transferring mechanism not shown.

In the heating zone 21, the glass sheet 1 comes into contact with the forming molds 2 and 3, and is heated. The glass sheet 1 is sequentially transferred from the heating zone 21 to the forming zone 22 and the cooling zone 23 by the transferring mechanism, gradually heated and pressurized by the forming molds 2 and 3 and the press 4 provided in each zone, and bend-formed and cooled. The bend-formed glass sheet is transferred to the air replacing chamber 30 and taken out.

In the forming molds 2 and 3 of FIG. 1, the lower mold 2 has a convex shape. However, the bend forming molds in which the lower mold has a concave shape may be used. In addition, in the forming apparatus 100, the forming molds 2 and 3 and the press 4 are provided in each zone of the forming chamber 20. However, using an apparatus provided with a press having a heating mechanism in the forming chamber, the glass sheet may be formed while transferring the forming molds between which the glass sheet is placed.

In any case, when a heating balance is lost, the glass sheet is sometimes elastically deformed. The glass sheet is sometimes cracked by coming into contact with the forming mold in a state elastically deformed.

In addition, the glass sheet is heated from the surface, and therefore, the temperature difference between the surface and inside of the glass sheet is sometimes large. In this case, thermal stress is generated in the inside of the glass sheet, and therefore, the glass sheet is sometimes cracked.

When the temperature varies during the forming, the viscosity of the glass to be formed varies. When the viscosity of the glass becomes too high, the glass sheet is less likely to be viscously deformed. Therefore, it becomes unable to be sufficiently formed. When the viscosity of the glass becomes too low, the glass sheet is excessively viscously deformed, sometimes resulting in a failure to obtain a desired shape, and furthermore, resulting in easy generation of surface defects.

The higher the temperature required for the bend forming of the glass sheet is, not only the more the energy consumption increases, but also the more the forming mold becomes easily consumed. In addition, heating unevenness in the glass sheet becomes liable to occur, because of an increased temperature gradient of the inside of the forming apparatus.

<Chemical Strengthening Treatment>

The glass for chemical strengthening of this aspect is subjected to the chemical strengthening treatment to obtain the chemically strengthened glass. Before the chemical strengthening treatment, shape processing depending on its application, for example, mechanical processing such as cutting, edge processing and hole drilling, is preferably performed.

The chemical strengthening treatment can be performed, for example, by cutting the produced glass for chemical strengthening to a desired size, thereafter, preheating the glass for chemical strengthening at about 400° C., and ion-exchanging, in a molten salt, Li in the glass sheet surface with Na in the molten salt or Na in the glass sheet surface with K in the molten salt.

In addition, the higher-strength chemically strengthened glass may be formed by performing ion exchange in a molten salt containing a specific salt, and thereafter, performing an acid treatment and an alkali treatment.

Examples of the molten salts for conducting the chemical strengthening treatment include, for example, alkali nitrates, alkali sulfates, alkali chlorides and the like, such as potassium nitrate, sodium nitrate, potassium sulfate and sodium sulfate. These molten salts may be used either alone or as a combination of two or more thereof. In addition, in order to adjust chemical strengthening properties, another salt may be mixed.

Adjustment of the surface compressive stress CS of the chemically strengthened glass is possible, for example, by adjusting the Na concentration in the molten potassium nitrate salt used for the ion exchange, the strengthening time and the molten salt temperature.

In addition, adjustment of the DOL is possible by adjusting the Na concentration in the molten potassium nitrate salt used for the ion exchange, the strengthening time and the molten salt temperature. In order to obtain higher DOL, the temperature of the molten salt is raised. Furthermore, adjustment of the internal tensile stress CT is possible by adjustment of the CS and the DOL described above.

When the glass sheet is dipped in sodium nitrate at 450° C. for 3 hours, and then, dipped in potassium nitrate at 450° C. for 1.5 hours, the surface compressive stress CS is preferably 600 MPa or more, more preferably 650 MPa or more, and still more preferably 700 MPa or more. On the other hand, when the CS and the DOL are too large, strengthening cracking is frequently generated in a strengthening process, which may cause a reduction in yield. Therefore, when the glass sheet is dipped in sodium nitrate at 450° C. for 3 hours, and then, dipped in potassium nitrate at 450° C. for 1.5 hours, the surface compressive stress CS is preferably 1100 MPa or less, more preferably 1000 MPa or less, and still more preferably 950 MPa or less.

When the glass sheet is dipped in sodium nitrate at 450° C. for 1 hour, the surface compressive stress CS is preferably 250 MPa or more, more preferably 280 MPa or more, and still more preferably 310 MPa or more. In addition, the DOL formed thereby is preferably 80 μm or more, more preferably 90 μm or more, and still more preferably 100 μm or more.

On the other hand, when the CS and the DOL are too large, the strengthening cracking is frequently generated in the strengthening process, which may cause a reduction in yield. Therefore, when the glass sheet is dipped in sodium nitrate at 450° C. for 1 hour, the surface compressive stress CS is preferably 400 MPa or less, more preferably 380 MPa or less, and still more preferably 360 MPa or less. In addition, the DOL is preferably 130 μm or less, more preferably 120 μm or less, and still more preferably 100 μm or less.

The ion exchange treatment by the sodium salt is a chemical strengthening treatment method which is effective when the DOL is desired to be increased while avoiding the cracking due to excessive strengthening. On the other hand, when the compressive stress in the glass surface is desired to be increased, the ion exchange treatment by the potassium salt is effective. When the treatment by the sodium salt and the treatment by the potassium salt are used together, the surface compressive stress and the DOL can be increased while avoiding the cracking due to excessive strengthening.

The chemically strengthened glass can be cut after the chemical strengthening treatment. It is possible to apply scribing and breaking by a usual wheel chip cutter, and cutting by laser is also possible. In order to keep the glass strength, a cut edge may be chamfered after the cutting. The chamfering may be mechanical grinding, and a treating method with a liquid chemical such as hydrofluoric acid may also be used.

[Second Aspect of Glass for Chemical Strengthening]

Next, a second aspect of the glass for chemical strengthening is described.

The second aspect is directed to a glass for chemical strengthening having a Young's modulus E of 80 to 90 GPa and an average coefficient α of thermal expansion at 50° C. to 350° C. of $60 \times 10^{-7}$ to $85 \times 10^{-7}$/° C. The glass for chemical strengthening of this aspect includes, in mass percentage on the basis of oxides: $SiO_2$ in an amount of 56 to 73%; $Al_2O_3$ in an amount of 10 to 24%; $B_2O_3$ in an amount of 0 to 6%; $P_2O_5$ in an amount of 0 to 6%; $Li_2O$ in an amount of 2 to 7%; $Na_2O$ in an amount of 3 to 11%; $K_2O$ in an amount of 0 to 5%; MgO in an amount of 0 to 8%; CaO in an amount of 0 to 2%; SrO in an amount of 0 to 5%; BaO in an amount of 0 to 5%; ZnO in an amount of 0 to 5%; $TiO_2$ in an amount of 0 to 2%; and $ZrO_2$ in an amount of 0 to 4%.

<Young's Modulus E>

In the glass for chemical strengthening according to this aspect, the Young's modulus is from 80 to 90 GPa, in order to achieve the scratch resistance and the cracking resistance during the bend forming. From the viewpoint of improving the scratch resistance, the Young's modulus is preferably 80 GPa or more, more preferably 81 GPa or more, and still more preferably 82 GPa or more, and from the viewpoint of improving the cracking resistance during the bend forming, it is preferably 90 GPa or less, more preferably 88 GPa or less, and still more preferably 86 GPa or less. The Young's modulus E can be measured, for example, by an ultrasonic pulse method.

<Coefficient of Thermal Expansion>

In the glass for chemical strengthening according to this aspect, the average coefficient α of thermal expansion at 50° C. to 350° C. is $85 \times 10^{-7}$/° C. or less, in order to achieve the cracking resistance during the forming. It is preferably $80 \times 10^{-7}$/° C. or less, and more preferably $76 \times 10^{-7}$/° C. or less. On the other hand, the glass having a small coefficient of thermal expansion tends to be poor in glass production efficiency, because of its high melting temperature and the like. Therefore, the average coefficient α of thermal expansion at 50° C. to 350° C. is $60 \times 10^{-7}$/° C. or more. It is preferably $64 \times 10^{-7}$/° C. or more, and more preferably $68 \times 10^{-7}$/° C. or more.

<Glass Composition>

The glass for chemical strengthening according to this aspect includes, in mass percentage on the basis of oxides: $SiO_2$ in an amount of 56 to 73%; $Al_2O_3$ in an amount of 10 to 24%; $B_2O_3$ in an amount of 0 to 6%; $P_2O_5$ in an amount of 0 to 6%; $Li_2O$ in an amount of 2 to 7%; $Na_2O$ in an amount of 3 to 11%; $K_2O$ in an amount of 0 to 5%; MgO in an amount of 0 to 8%; CaO in an amount of 0 to 2%; SrO in an amount of 0 to 5%; BaO in an amount of 0 to 5%; ZnO in an amount of 0 to 5%; $TiO_2$ in an amount of 0 to 2%; and $ZrO_2$ in an amount of 0 to 4%. Reasons for specifying the respective components as described above are as described in the first aspect.

<Other Properties and the Like>

The preferred numerical ranges of the temperature Tf at which the viscosity of the glass reaches 100 MPa·s, the softening temperature, the thermal conductivity $\sigma_{500}$ at 500° C., the thermal conductivity $\sigma_{20}$ at room temperature, the mirror constant, the mirror constant of the annealed glass and the β-OH value and the technical effects accompanying therewith in the glass for chemical strengthening according to this aspect are the same as in the first aspect.

Further, a method for manufacturing the glass for chemical strengthening according to this aspect is not particularly limited, and the glass can be manufactured, for example, in the same manner as in the first aspect.

Furthermore, the glass for chemical strengthening according to this aspect can be bend-formed in the same manner as in the first aspect.

In addition, the glass for chemical strengthening according to this aspect can be subjected to the chemical strengthening treatment in the same manner as in the first aspect.

[Chemically Strengthened Glass]

Next, an embodiment of the chemically strengthened glass of the present invention is described.

The chemically strengthened glass of this aspect is a chemically strengthened glass bend-formed to have a curved surface shape.

The chemically strengthened glass of this aspect includes, in mass percentage on the basis of oxides: $SiO_2$ in an amount of 56 to 73%; $Al_2O_3$ in an amount of 10 to 24%; $B_2O_3$ in an amount of 0 to 6%; $P_2O_5$ in an amount of 0 to 6%; $Li_2O$ in an amount of 2 to 7%; $Na_2O$ in an amount of 3 to 11%; $K_2O$ in an amount of 0 to 5%; MgO in an amount of 0 to 8%; CaO in an amount of 0 to 2%; SrO in an amount of 0 to 5%; BaO in an amount of 0 to 5%; ZnO in an amount of 0 to 5%; $TiO_2$ in an amount of 0 to 2%; and $ZrO_2$ in an amount of 0 to 4%, and devitrification is not observed.

The chemically strengthened glass of this aspect can be produced, for example, by subjecting the first or second aspect of the glass for chemical strengthening described above to the bend forming and the chemical strengthening treatment by the methods described above.

Reasons for specifying the base composition of the chemically strengthened glass according to this aspect as described above are as described in the first aspect.

In the chemically strengthened glass of this aspect, devitrification is not observed. Therefore, the quality thereof is excellent. The term "devitrification is not observed" as used herein means that crystal precipitation is not observed on the surface and in the inside of the glass by microscope observation.

The applications of the glass for chemical strengthening and chemically strengthened glass of the present invention are not particularly limited. The chemically strengthened glass has high mechanical strength, and therefore, is suitable for use in a place where an impact caused by falling or contact with another substance is anticipated.

Specifically, for example, there are applications to cover glasses for display parts of mobile phones (including multifunctional information terminals such smart phones), PHSs, PDAs, tablet type terminals and the like and cover glasses of touch panel operation monitors of these equipment.

In addition, the glass may be used, for example, for window glasses of vehicles, vessels, aircrafts and the like, domestic or industrial illumination equipment and the like.

EXAMPLES

The present invention is further described below using Examples. The present invention is not construed as being limited to the following.

Regarding each of Cases 1 to 38, a glass raw material was prepared so as to have each glass composition shown in molar ratio in Tables 1 to 4, placed in a platinum crucible, melted at 1500 to 1700° C. for 3 hours, defoamed and homogenized to obtain about 1000 g of a glass. Regarding each of Cases 2, 3, 8 to 19 and 24 to 38, in order to adjust the moisture content in the glass (β-OH value) high, a nitrogen gas whose dew point was adjusted to 50° C. was allowed to flow in a glass melting furnace for melting. The molten glass obtained was poured into a mold, held at a temperature about 50° C. higher than the glass transition temperature for 1 hour, and then, cooled to room temperature at a cooling rate of 0.5° C./min to obtain a glass block. The glass block obtained was cut, ground and mirror-polished to obtain a glass sheet having a desired shape.

Case 3A is an example in which a glass having almost the same composition as in Case 3 was produced by a float process. However, the glass is more easily crystallized than that in Case 3, because a slight amount of $TiO_2$ was contained.

Physical property of the glass sheets obtained were measured by the following methods. Measurement results and $X_1$, $X_2$ and $X_3$ determined from the measurement results and the total thereof are shown in Tables 5 to 8, together with the glass compositions in mass percentage. In Tables 5 to 8, the value indicated in < > is a calculated value. In addition, blank columns indicate "Unmeasured".

<Density [Unit: g/cm³]>

Measurement was made by an Archimedes method.

<Average Coefficient α of Thermal Expansion [Unit: $10^{-7}$/° C.] and Glass Transition Temperature Tg [Unit: ° C.]>

Measurement was made by the method described in JIS R3102:1995, and the average coefficient α of thermal expansion at 50 to 350° C. and the glass transition temperature Tg were determined.

<Young's Modulus E [unit: GPa], Modulus of Rigidity G [Unit: GPa] and Poisson Ratio>

Measurement was made by an ultrasonic pulse method (see JIS R1602:1995).

<Softening Temperature Ts [Unit: ° C.]>

Measurement was made by the fiber elongation method described in JIS R3103-1:2001.

<Tf [Unit: ° C.] and $\eta_{+10}$ [Unit: $10^5$ Pa·s]>

Measurement was made by using a beam-bending method (JIS R3103-2:2001).

<Thermal Conductivity [Unit: W/mk]>

The thermal diffusivity at each of 500° C. and 20° C. was measured by a laser flash method measuring device (TC-9000, manufactured by ULVAC RIKO, Inc.), and from the value obtained, specific heat measured by an adiabatic specific heat measuring device (SH-3000, manufactured by SHINKU RIKO Co., Ltd.) and the viscosity measured by the Archimedes method, the thermal conductivity at each temperature was determined. In Tables, $\sigma_{500}$ is the thermal conductivity at 500° C. and $\sigma_{20}$ is the thermal conductivity at 20° C.

Regarding each of Cases 2, 5, 7 to 30 and 32 to 38, the thermal conductivity $\sigma_{500}$ at 500° C. was determined by calculation by the method described in J. Japan Inst. Metals, Vol. 65, No. 8 (2001) 680-687, "Equation for Estimating the Thermal Diffusivity, Specific Heat and Thermal Conductivity of Oxide Glasses".

<Mirror Constant of the Annealed Glass [Unit: MPa·m$^{1/2}$]>

The mirror constant of the annealed glass was measured by performing glass processing, flaw formation, a bending test and fractured surface observation by the following procedures.

(Processing)

Processing was performed to a size of 40 mm×6 mm×3 mm, and front and back surfaces and edge surfaces in a longitudinal direction (4 surfaces in total) were mirror-polished.

(Flaw Formation)

Using a Vickers hardness tester and using a diamond indenter of 110°, the indenter was pushed in at different loads to form flaws. The push-in loads were 0.05 kgf, 0.1 kgf, 0.3 kgf, 0.5 kgf, 0.75 kgf, 1.0 kgf, 2.0 kgf and 3.0 kgf.

(Heat Treatment)

In order to remove an influence of distortion caused by flaw formation, the glass was held at a temperature 30° C. higher than Tg for 1 hour, and precisely annealed to room temperature at 1° C./min.

(Bending Test)

A jig for four-point bending having a load-side (upper) span of 10 mm and a support-side (lower) span of 30 mm was used. A tape was stuck to a surface opposite to a flaw-formed surface of the glass after the flaw formation and the heat treatment, a load was applied thereto with the flaw-formed surface downward (with the tape-stuck surface upward), and the load when fractured was measured. Using the following formula, the stress when fractured was determined from the load measured.

$$s = \{3F(Ls-LI)\}/(2wh^2)$$

Here, s is a stress (MPa) when fractured, F is a load (N) when fractured, Ls is a distance (mm) between lower supporting points, LI is a distance (mm) between upper loading points, w is a sample width (mm), and h is a sample thickness (mm).

(Fractured Surface Observation)

A fractured surface was observed using a KEYENCE digital microscope VHX-5000, and the distance R from a fracture starting point to a boundary between a mirror surface and a mist surface was measured. When observed, the sample and a lens of the microscope were made parallel to each other, and the observation was performed at a magnification of 20×150 times.

From the results obtained by the above procedures, the mirror constant of the annealed glass A was determined using the following formula.

$$s = A/R^{1/2}$$

<Crystallization Temperature Tc [Unit: ° C.]>

About 70 mg of the glass was finely pulverized with an agate mortar, and measurement was made up to 1000° C. at a temperature rising rate of 10° C./min using a differential scanning calorimeter (DSC).

<β-OH Value>

The minimum transmittance in an absorption peak of an OH group near 3570 $cm^{-1}$ and the transmittance at a reference wavelength of 4000 $cm^{-1}$ were measured by FT-IR measurement, and the β-OH value was determined.

<Chemical Strengthening Properties By Two-Stage Strengthening>

Regarding each glass of Cases 1 to 3 and 7 to 38, the glass sheet whose both surfaces were mirror-polished to have a thickness of 0.8 mm was dipped in a molten salt of sodium nitrate at 450° C. for 3 hours, and thereafter, dipped in a molten salt of potassium nitrate at 450° C. for 1.5 hours to obtain a chemically strengthened glass. According to this treatment, a deep compressive stress layer is first formed by ion exchange between lithium ions in the glass composition and sodium ions in the molten salt, and then, large compressive stress is formed in the vicinity of a glass surface by ion exchange between sodium ions in the glass and potassium ions in the molten salt. The surface compressive stress CS1 [unit: MPa] and the depth of compressive stress layer DOL1 [unit: μm] measured by a stress measuring device FSM-6000 for the chemically strengthened glass obtained are shown in Tables 5 to 8. In addition, regarding the same chemically strengthened glass, the depth of compressive stress layer DOL2 [unit: μm] measured by a surface stress meter manufactured by Orihara Manufacturing Co., Ltd., a stress measuring device applying scattering light photoelasticity (the ER1 mode of SLP1000 manufactured by Orihara Manufacturing Co.), is shown in the Tables. The stress measuring device FSM-6000 is a device suitable for measurement of the surface compressive stress. However, it is difficult to accurately measure the depth of the compressive stress layer generated by the ion exchange between lithium ions and sodium ions. On the other hand, according to the ER1 mode of SLP1000 manufactured by Orihara Manufacturing Co., Ltd., the depth of the compressive stress layer generated by the ion exchange between lithium ions and sodium ions can be accurately measured. Therefore, evaluation was performed by using two kinds of devices together.

<Chemical Strengthening Properties By Sodium Salt>

Regarding each glass of Cases 1 to 3 and 7 to 38, the glass sheet whose both surfaces were mirror-polished to have a thickness of 0.8 mm was dipped in a molten salt of sodium nitrate at 450° C. for 1 hour. The surface compressive stress CS3 [unit: MPa] and the depth of compressive stress layer DOL3 [unit: μm] measured by the stress measuring device applying scattering light photoelasticity (the ER1 mode of SLP1000 manufactured by Orihara Manufacturing Co., Ltd.) for the chemically strengthened glass obtained are shown in Tables 5 to 8.

TABLE 1

| Molar ratio | Case 1 | Case 2 | Case 3 | Case 4 | Case 5 | Case 6 | Case 7 | Case 8 | Case 9 |
|---|---|---|---|---|---|---|---|---|---|
| $SiO_2$ | 64.9 | 69 | 70 | 64.5 | 67.1 | 68.8 | 68 | 67 | 69 |
| $Al_2O_3$ | 15.6 | 9 | 7.5 | 8 | 13.1 | 2.9 | 10 | 11 | 9 |
| $B_2O_3$ | 0 | 0 | 0 | 0 | 3.6 | 0 | 0 | 0 | 0 |
| $P_2O_5$ | 1.2 | 0 | 0 | 0 | 0 | 0 | 0 | 0 | 0 |
| $Li_2O$ | 6.2 | 9.5 | 8 | 0 | 0 | 0 | 9.5 | 9 | 9.5 |
| $Na_2O$ | 10.8 | 4.5 | 5.3 | 12.5 | 13.7 | 14.2 | 4.5 | 6 | 4.5 |
| $K_2O$ | 0 | 1 | 1 | 4 | 0.1 | 0.1 | 1 | 1 | 1 |
| MgO | 0 | 6 | 7 | 10.6 | 2.3 | 6.1 | 6 | 6 | 4 |
| CaO | 0 | 0 | 0.2 | 0.1 | 0 | 7.8 | 0 | 0 | 2 |
| SrO | 0 | 0 | 0 | 0.1 | 0 | 0 | 0 | 0 | 0 |
| BaO | 0 | 0 | 0 | 0.1 | 0 | 0 | 0 | 0 | 0 |
| ZnO | 1.1 | 0 | 0 | 0 | 0 | 0 | 0 | 0 | 0 |
| $TiO_2$ | 0 | 0.04 | 0.04 | 0 | 0 | 0 | 0.04 | 0.04 | 0.04 |
| $ZrO_2$ | 0 | 1 | 1 | 0.1 | 0 | 0 | 0.5 | 0 | 1 |

TABLE 2

| Molar ratio | Case 10 | Case 11 | Case 12 | Case 13 | Case 14 | Case 15 | Case 16 | Case 17 | Case 18 | Case 19 |
|---|---|---|---|---|---|---|---|---|---|---|
| $SiO_2$ | 69 | 69 | 69 | 69 | 69 | 69 | 69 | 69 | 65 | 69 |
| $Al_2O_3$ | 9 | 9 | 9 | 8 | 7 | 9 | 9 | 8 | 9 | 9 |
| $B_2O_3$ | 0 | 0 | 0 | 0 | 0 | 0 | 0 | 0 | 4 | 0 |
| $P_2O_5$ | 0 | 0 | 0 | 0 | 0 | 0 | 0 | 0 | 0 | 0 |
| $Li_2O$ | 9.5 | 9.5 | 9.5 | 9.5 | 9.5 | 8.5 | 7.5 | 8.5 | 9.5 | 9.5 |
| $Na_2O$ | 4.5 | 4.5 | 4.5 | 5.5 | 6.5 | 5.5 | 6.5 | 6.5 | 4.5 | 4.5 |
| $K_2O$ | 1 | 1 | 1 | 1 | 1 | 1 | 1 | 1 | 1 | 1 |
| MgO | 4 | 2 | 4 | 6 | 6 | 6 | 6 | 6 | 6 | 5.5 |
| CaO | 0 | 2 | 1 | 0 | 0 | 0 | 0 | 0 | 0 | 0.5 |
| SrO | 2 | 2 | 1 | 0 | 0 | 0 | 0 | 0 | 0 | 0 |
| BaO | 0 | 0 | 0 | 0 | 0 | 0 | 0 | 0 | 0 | 0 |
| ZnO | 0 | 0 | 0 | 0 | 0 | 0 | 0 | 0 | 0 | 0 |
| $TiO_2$ | 0.04 | 0.04 | 0.04 | 0.04 | 0.04 | 0.04 | 0.04 | 0.04 | 0.04 | 0.04 |
| $ZrO_2$ | 1 | 1 | 1 | 1 | 1 | 1 | 1 | 1 | 1 | 0 |

TABLE 3

| Molar ratio | Case 20 | Case 21 | Case 22 | Case 23 | Case 24 | Case 25 | Case 26 | Case 27 | Case 28 | Case 29 |
|---|---|---|---|---|---|---|---|---|---|---|
| $SiO_2$ | 69 | 69 | 69 | 70 | 71 | 69.2 | 69.7 | 69.7 | 70.2 | 69 |
| $Al_2O_3$ | 9 | 8 | 8 | 8 | 7 | 8 | 7.5 | 8 | 7.5 | 7.5 |
| $B_2O_3$ | 0 | 0 | 0 | 0 | 0 | 0 | 0 | 0 | 0 | 0 |
| $P_2O_5$ | 0 | 0 | 0 | 0 | 0 | 0 | 0 | 0 | 0 | 0 |
| $Li_2O$ | 9.5 | 8.5 | 8.5 | 8.5 | 8.5 | 8.5 | 8.5 | 8.5 | 8.5 | 8.5 |
| $Na_2O$ | 4.5 | 7.5 | 7.5 | 7.5 | 7.5 | 5.3 | 5.3 | 5.3 | 5.3 | 5.3 |
| $K_2O$ | 1 | 0 | 0 | 0 | 0 | 1 | 1 | 1 | 1 | 1 |
| MgO | 5 | 6 | 7 | 6 | 6 | 7 | 7 | 7 | 7 | 8 |
| CaO | 0.5 | 0 | 0 | 0 | 0 | 0 | 0 | 0 | 0 | 0.2 |
| SrO | 0.5 | 0 | 0 | 0 | 0 | 0 | 0 | 0 | 0 | 0 |
| BaO | 0 | 0 | 0 | 0 | 0 | 0 | 0 | 0 | 0 | 0 |
| ZnO | 0 | 0 | 0 | 0 | 0 | 0 | 0 | 0 | 0 | 0 |
| $TiO_2$ | 0.04 | 0.04 | 0.04 | 0.04 | 0.04 | 0.04 | 0.04 | 0.04 | 0.04 | 0.04 |
| $ZrO_2$ | 1 | 1 | 0 | 0 | 0 | 1 | 1 | 1 | 1 | 1 |

TABLE 4

| Molar ratio | Case 30 | Case 31 | Case 32 | Case 33 | Case 34 | Case 35 | Case 36 | Case 37 | Case 38 |
|---|---|---|---|---|---|---|---|---|---|
| $SiO_2$ | 68 | 70 | 69 | 69 | 70 | 70 | 70 | 71.5 | 72.5 |
| $Al_2O_3$ | 7.5 | 7.5 | 7.5 | 7.5 | 8 | 8.5 | 8 | 7.5 | 7.5 |
| $B_2O_3$ | 0 | 0 | 0 | 0 | 0 | 0 | 0 | 0 | 0 |
| $P_2O_5$ | 0 | 0 | 0 | 0 | 0 | 0 | 0 | 0 | 0 |
| $Li_2O$ | 8 | 7 | 7 | 7 | 7 | 7 | 7 | 7 | 7 |
| $Na_2O$ | 5.3 | 5.3 | 5.3 | 5.3 | 5.3 | 5.3 | 5.3 | 5.3 | 5.3 |
| $K_2O$ | 1 | 1 | 1 | 1 | 1 | 1 | 1 | 1 | 1 |
| MgO | 9 | 8 | 9 | 8 | 7.5 | 7 | 7 | 7 | 6 |
| CaO | 0.2 | 0.2 | 0.2 | 0.2 | 0.2 | 0.2 | 0.2 | 0.2 | 0.2 |
| SrO | 0 | 0 | 0 | 0 | 0 | 0 | 0 | 0 | 0 |
| BaO | 0 | 0 | 0 | 0 | 0 | 0 | 0 | 0 | 0 |
| ZnO | 0 | 0 | 0 | 0 | 0 | 0 | 0 | 0 | 0 |
| $TiO_2$ | 0.04 | 0.04 | 0.04 | 0.04 | 0.04 | 0.04 | 0.04 | 0.04 | 0.04 |
| $ZrO_2$ | 1 | 1 | 1 | 1 | 1 | 1 | 1 | 1 | 1 |

TABLE 5

| Mass percentage | Case 1 | Case 2 | Case 3 | Case 3A | Case 4 | Case 5 | Case 6 | Case 7 | Case 8 | Case 9 |
|---|---|---|---|---|---|---|---|---|---|---|
| $SiO_2$ | 57.4 | 68.1 | 69.5 | 69.2 | 60.9 | 61.2 | 68.9 | 67 | 65.7 | 67.7 |
| $Al_2O_3$ | 23.4 | 15.1 | 12.6 | 12.7 | 12.8 | 20.4 | 4.9 | 16.7 | 18.3 | 15 |

TABLE 5-continued

| Mass percentage | Case 1 | Case 2 | Case 3 | Case 3A | Case 4 | Case 5 | Case 6 | Case 7 | Case 8 | Case 9 |
|---|---|---|---|---|---|---|---|---|---|---|
| $B_2O_3$ | 0 | 0 | 0 | 0 | 0 | 3.8 | 0 | 0 | 0 | 0 |
| $P_2O_5$ | 5.1 | 0 | 0 | 0 | 0 | 0 | 0 | 0 | 0 | 0 |
| $Li_2O$ | 2.7 | 4.7 | 3.9 | 3.9 | 0 | 0 | 0 | 4.7 | 4.4 | 4.6 |
| $Na_2O$ | 9.9 | 4.6 | 5.4 | 5.5 | 12.2 | 12.9 | 14.7 | 5.1 | 6.1 | 4.6 |
| $K_2O$ | 0 | 1.5 | 1.6 | 1.5 | 5.9 | 0.2 | 0.2 | 1.5 | 1.5 | 1.5 |
| MgO | 0 | 4 | 4.7 | 4.7 | 6.7 | 1.4 | 4.1 | 4 | 3.9 | 2.6 |
| CaO | 0 | 0 | 0.2 | 0.2 | 0.1 | 0 | 7.3 | 0 | 0 | 1.8 |
| SrO | 0 | 0 | 0 | 0 | 0.2 | 0 | 0 | 0 | 0 | 0 |
| BaO | 0 | 0 | 0 | 0 | 0.2 | 0 | 0 | 0 | 0 | 0 |
| ZnO | 1.4 | 0 | 0 | 0 | 0 | 0 | 0 | 0 | 0 | 0 |
| $TiO_2$ | 0 | 0 | 0 | 0.2 | 0 | 0 | 0 | 0.05 | 0.05 | 0.05 |
| $ZrO_2$ | 0 | 2 | 2 | 2 | 1 | 0 | 0 | 1 | 0 | 2 |
| $Fe_2O_3$ | 0 | 0 | 0 | 0.008 | 0 | 0 | 0 | 0 | 0.005 | 0.005 |
| β-OH | | 0.23 | 0.21 | 0.27 | | | | 0.22 | 0.24 | 0.21 |
| Density | | 2.44 | 2.44 | | | | | 2.43 | 2.43 | 2.45 |
| Average coefficient α of thermal expansion | 78.8 | 70 | 72 | 72 | 98 | 79 | 92 | 74 | 75 | 72 |
| Glass transition temperature Tg | | 550 | 548 | | | | | 555 | 551 | 540 |
| Young's modulus E | 76.7 | 84 | 82.6 | | 74 | 64 | 71 | 83.6 | 83 | 84.7 |
| Modulus of rigidity G | | | 33.8 | | | | | 34.4 | 34.2 | 34.6 |
| Poisson ratio | | 0.22 | 0.22 | | | | | 0.22 | 0.22 | 0.22 |
| Softening temperature Ts | | 780 | 774 | | | | | 780 | 783 | 750 |
| Tf | 776.5 | 708.2 | 700 | | 734.5 | 828 | 676.2 | 707 | 703 | 692 |
| $X_1$ | 604 | 588 | 595 | | 725 | 506 | 654 | 619 | 622 | 610 |
| $X_2$ | 777 | 708 | 700 | | 735 | 828 | 676 | 707 | 703 | 692 |
| $X_3$ | 372 | 355 | 350 | | 368 | 327 | 442 | 352 | 352 | 352 |
| $X_1 + X_2 + X_3$ | 1753 | 1651 | 1645 | | 1827 | 1661 | 1772 | 1678 | 1677 | 1654 |
| Thermal conductivity σ20 | 1.09 | | | 1.17 | 0.98 | | | | | |
| Thermal conductivity σ500 | 1.4 | <1.44> | 1.51 | 1.51 | 1.26 | <1.28> | 1.39 | <1.44> | <1.43> | <1.43> |
| Mirror constant of the annealed glass | 2.16 | 2.49 | 2.49 | | 1.85 | 2.26 | 2 | 2.37 | 2.39 | 2.36 |
| Crystallization temperature Tc | | 754 | No peak | | | | | 762 | 723 | 796 |
| Tc − Ts | | −26 | | | | | | −17.6 | −59.7 | 46.1 |
| CS1 | 980 | 906 | 897 | | | | | 884 | 858 | 891 |
| DOL1 | 18 | 9 | 9 | | | | | 10 | 11 | 7 |
| DOL2 | 174 | 173 | 157 | | | | | 173 | 171 | 161 |
| CS3 | 300 | 382 | 320 | | | | | 377 | 354 | 353 |
| DOL3 | 130 | 101 | 100 | | | | | 102 | 106 | 116 |

TABLE 6

| Mass percentage | Case 10 | Case 11 | Case 12 | Case 13 | Case 14 | Case 15 | Case 16 | Case 17 | Case 18 | Case 19 |
|---|---|---|---|---|---|---|---|---|---|---|
| $SiO_2$ | 66.7 | 66.4 | 67.2 | 68.5 | 69 | 67.7 | 67.4 | 68.2 | 63.7 | 68 |
| $Al_2O_3$ | 14.8 | 14.7 | 14.9 | 13.5 | 11.9 | 15 | 14.9 | 13.4 | 15 | 15.1 |
| $B_2O_3$ | 0 | 0 | 0 | 0 | 0 | 0 | 0 | 0 | 4.5 | 0 |
| $P_2O_5$ | 0 | 0 | 0 | 0 | 0 | 0 | 0 | 0 | 0 | 0 |
| $Li_2O$ | 4.6 | 4.5 | 4.6 | 4.7 | 4.7 | 4.1 | 3.6 | 4.2 | 4.6 | 4.7 |
| $Na_2O$ | 4.5 | 4.5 | 4.5 | 5.6 | 6.7 | 5.6 | 6.5 | 6.6 | 4.6 | 4.6 |
| $K_2O$ | 1.5 | 1.5 | 1.5 | 1.6 | 1.6 | 1.5 | 1.5 | 1.5 | 1.5 | 1.5 |
| MgO | 2.6 | 1.3 | 2.6 | 4 | 4 | 4 | 3.9 | 4 | 3.9 | 3.6 |
| CaO | 0 | 1.8 | 0.9 | 0 | 0 | 0 | 0 | 0 | 0 | 0.5 |
| SrO | 3.3 | 3.3 | 1.7 | 0 | 0 | 0 | 0 | 0 | 0 | 0 |
| BaO | 0 | 0 | 0 | 0 | 0 | 0 | 0 | 0 | 0 | 0 |
| ZnO | 0 | 0 | 0 | 0 | 0 | 0 | 0 | 0 | 0 | 0 |
| $TiO_2$ | 0.05 | 0.05 | 0.05 | 0.05 | 0.05 | 0.05 | 0.05 | 0.05 | 0.05 | 0.05 |
| $ZrO_2$ | 2 | 2 | 2 | 2 | 2.1 | 2 | 2 | 2 | 2 | 2 |
| $Fe_2O_3$ | 0.005 | 0.005 | 0.005 | 0.013 | 0.013 | 0.013 | 0.013 | 0.013 | 0.013 | 0.013 |
| β-OH | 0.22 | 0.24 | 0.22 | 0.23 | 0.23 | 0.21 | 0.22 | 0.24 | 0.24 | 0.15 |
| Density | 2.48 | 2.49 | 2.47 | 2.44 | 2.44 | 2.44 | 2.44 | 2.44 | 2.44 | 2.44 |
| Average coefficient α of thermal expansion | 72.5 | 74.2 | 71.4 | 75.5 | 81 | 72.6 | 72.1 | 75.7 | 72.3 | 72.5 |
| Glass transition temperature Tg | 534 | 524 | 534 | 530 | 510 | 558 | 560 | 531 | 526 | 552 |
| Young's modulus E | 84.2 | 84.8 | 84.2 | 83.2 | 83.2 | 83.5 | 83 | 82.2 | 84 | 84.8 |
| Modulus of rigidity G | 33.9 | 34 | 34.1 | 34.1 | 34.1 | 34.2 | 34 | 33.7 | 34.5 | 34.8 |
| Poisson ratio | 0.22 | 0.22 | 0.22 | 0.22 | 0.22 | 0.22 | 0.21 | 0.21 | 0.23 | 0.23 |
| Softening temperature Ts | 752 | 746 | 754 | | 734 | 798 | 812 | 776 | 749 | 797 |

TABLE 6-continued

| Mass percentage | Case 10 | Case 11 | Case 12 | Case 13 | Case 14 | Case 15 | Case 16 | Case 17 | Case 18 | Case 19 |
|---|---|---|---|---|---|---|---|---|---|---|
| Tf | 686 | 676 | 686 | 682 | 662 | 710 | 712 | 683 | 678 | 704 |
| $X_1$ | 610 | 629 | 601 | 628 | 674 | 606 | 598 | 623 | 607 | 615 |
| $X_2$ | 686 | 676 | 686 | 682 | 662 | 710 | 712 | 683 | 678 | 704 |
| $X_3$ | 352 | 352 | 352 | 352 | 352 | 352 | 352 | 352 | 352 | 352 |
| $X_1 + X_2 + X_3$ | 1648 | 1657 | 1639 | 1662 | 1689 | 1668 | 1662 | 1658 | 1637 | 1670 |
| Thermal conductivity σ20 | | 1.14 | | | | | | | | |
| Thermal conductivity σ500 | <1.42> | <1.41> | <1.42> | <1.44> | <1.43> | <1.43> | <1.42> | <1.42> | <1.42> | <1.44> |
| Mirror constant of the annealed glass | | | | | | | | | | |
| Crystallization temperature Tc | 803 | 811 | 800 | | No peak | 840 | No peak | 868 | 790 | 808 |
| Tc − Ts | 51.3 | 65.5 | 45.6 | | | 41.9 | | 91.5 | 41.4 | 11.6 |
| CS1 | 884 | 860 | 888 | 767 | 737 | 945 | 986 | 835 | 893 | 933 |
| DOL1 | 6 | 4 | 7 | 10 | 9 | 10 | 11 | 10 | 8 | 9 |
| DOL2 | 158 | 148 | 160 | 161 | 151 | 164 | 157 | 154 | 161 | 169 |
| CS3 | 314 | 285 | 333 | 339 | 297 | 344 | 306 | 302 | 384 | 374 |
| DOL3 | 99 | 114 | 107 | 100 | 98 | 104 | 108 | 103 | 93 | 105 |

TABLE 7

| Mass percentage | Case 20 | Case 21 | Case 22 | Case 23 | Case 24 | Case 25 | Case 26 | Case 27 | Case 28 | Case 29 |
|---|---|---|---|---|---|---|---|---|---|---|
| $SiO_2$ | 67.7 | 68.5 | 69.5 | 70.3 | 71.8 | 68.6 | 69.4 | 68.9 | 69.7 | 68.7 |
| $Al_2O_3$ | 15 | 13.5 | 13.7 | 13.6 | 12 | 13.5 | 12.7 | 13.4 | 12.6 | 12.7 |
| $B_2O_3$ | 0 | 0 | 0 | 0 | 0 | 0 | 0 | 0 | 0 | 0 |
| $P_2O_5$ | 0 | 0 | 0 | 0 | 0 | 0 | 0 | 0 | 0 | 0 |
| $Li_2O$ | 4.6 | 4.2 | 4.3 | 4.2 | 4.3 | 4.2 | 4.2 | 3.9 | 3.9 | 4 |
| $Na_2O$ | 4.6 | 7.7 | 7.8 | 7.8 | 7.8 | 5.4 | 5.4 | 5.4 | 5.4 | 5.4 |
| $K_2O$ | 1.5 | 0 | 0 | 0 | 0 | 1.6 | 1.6 | 1.6 | 1.6 | 1.6 |
| MgO | 3.3 | 4 | 4.7 | 4 | 4.1 | 4.7 | 4.7 | 4.6 | 4.7 | 5.3 |
| CaO | 0.5 | 0 | 0 | 0 | 0 | 0 | 0 | 0 | 0 | 0.2 |
| SrO | 0.8 | 0 | 0 | 0 | 0 | 0 | 0 | 0 | 0 | 0 |
| BaO | 0 | 0 | 0 | 0 | 0 | 0 | 0 | 0 | 0 | 0 |
| ZnO | 0 | 0 | 0 | 0 | 0 | 0 | 0 | 0 | 0 | 0 |
| $TiO_2$ | 0.05 | 0.05 | 0.05 | 0.05 | 0.05 | 0.05 | 0.05 | 0.05 | 0.05 | 0.05 |
| $ZrO_2$ | 2 | 2 | 0 | 0 | 0 | 2 | 2 | 2 | 2 | 2 |
| $Fe_2O_3$ | 0.013 | 0.026 | 0.027 | 0.027 | 0.027 | 0.026 | 0.026 | 0.026 | 0.026 | 0.005 |
| β-OH | 0.14 | 0.14 | 0.15 | 0.22 | 0.24 | 0.24 | 0.23 | 0.2 | 0.21 | 0.29 |
| Density | 2.45 | 2.45 | 2.42 | 2.41 | 2.41 | 2.44 | 2.44 | 2.44 | 2.44 | 2.45 |
| Average coefficient α of thermal expansion | 70.1 | 75 | 76.5 | 76.9 | 77.6 | 72.4 | 72.3 | 71.4 | 73.7 | 73.1 |
| Glass transition temperature Tg | 544 | 538 | 528 | 524 | 514 | 552 | 547 | 559 | 544 | 551 |
| Young's modulus E | 84.3 | 83.2 | 82.4 | 81.6 | 81.2 | 83.6 | 83.5 | 83.2 | 83.2 | 83.8 |
| Modulus of rigidity G | 34.4 | 34 | 34 | 33.8 | 33.7 | 34.2 | 34.2 | 34.1 | 34.1 | 34.2 |
| Poisson ratio | 0.22 | 0.22 | 0.22 | 0.21 | 0.22 | 0.22 | 0.22 | 0.22 | 0.22 | 0.22 |
| Softening temperature Ts | 783 | | | | 728 | 767 | 772 | 783 | 780 | 766 |
| Tf | 696 | 690 | 680 | 676 | 666 | 704 | 699 | 711 | 696 | 703 |
| $X_1$ | 591 | 624 | 631 | 628 | 630 | 605 | 603 | 594 | 613 | 613 |
| $X_2$ | 696 | 690 | 680 | 676 | 666 | 704 | 699 | 711 | 696 | 703 |
| $X_3$ | 352 | 352 | 352 | 352 | 352 | 352 | 352 | 352 | 352 | 352 |
| $X_1 + X_2 + X_3$ | 1639 | 1666 | 1662 | 1656 | 1648 | 1661 | 1653 | 1657 | 1661 | 1668 |
| Thermal conductivity σ20 | | | | | | | | | | |
| Thermal conductivity σ500 | <1.43> | <1.42> | <1.44> | <1.43> | <1.43> | <1.44> | <1.44> | <1.43> | <1.43> | <1.44> |
| Mirror constant of the annealed glass | | | | | | | | | | |
| Crystallization temperature Tc | 806 | | | | 817 | 837 | 831 | 837 | 853 | 848 |
| Tc − Ts | 22.9 | | | | 89.3 | 69.7 | 59 | 53.4 | 72.5 | 81.2 |
| CS1 | 901 | 843 | 730 | 689 | 596 | 904 | 863 | 923 | 890 | 943 |
| DOL1 | 8 | 9 | 9 | 9 | 10 | 8 | 8 | 8 | 8 | 7 |
| DOL2 | 165 | 158 | 159 | 166 | 167 | 157 | 156 | 159 | 158 | 155 |
| CS3 | 357 | 303 | 282 | 264 | 240 | 341 | 329 | 331 | 320 | 338 |
| DOL3 | 104 | 113 | 110 | 116 | 115 | 98 | 98 | 100 | 100 | 95 |

TABLE 8

| Mass percentage | Case 30 | Case 31 | Case 32 | Case 33 | Case 34 | Case 35 | Case 36 | Case 37 | Case 38 |
|---|---|---|---|---|---|---|---|---|---|
| $SiO_2$ | 68 | 69.4 | 68.6 | 68.4 | 69 | 68.7 | 68.9 | 70.7 | 71.4 |
| $Al_2O_3$ | 12.7 | 12.6 | 12.7 | 12.6 | 13.4 | 14.2 | 13.4 | 12.6 | 12.5 |
| $B_2O_3$ | 0 | 0 | 0 | 0 | 0 | 0 | 0 | 0 | 0 |
| $P_2O_5$ | 0 | 0 | 0 | 0 | 0 | 0 | 0 | 0 | 0 |
| $Li_2O$ | 4 | 3.5 | 3.5 | 3.5 | 3.4 | 3.4 | 3.4 | 3.6 | 3.6 |
| $Na_2O$ | 5.5 | 5.4 | 5.4 | 5.4 | 5.4 | 5.4 | 5.4 | 4.4 | 4.4 |
| $K_2O$ | 1.6 | 1.6 | 1.6 | 1.6 | 1.5 | 1.5 | 1.5 | 1.9 | 1.9 |
| MgO | 6 | 5.3 | 6 | 5.3 | 5 | 4.6 | 4.6 | 4.6 | 4 |
| CaO | 0.2 | 0.2 | 0.2 | 1.1 | 0.2 | 0.2 | 0.6 | 0.2 | 0.2 |
| SrO | 0 | 0 | 0 | 0 | 0 | 0 | 0 | 0 | 0 |
| BaO | 0 | 0 | 0 | 0 | 0 | 0 | 0 | 0 | 0 |
| ZnO | 0 | 0 | 0 | 0 | 0 | 0 | 0 | 0 | 0 |
| $TiO_2$ | 0.05 | 0.05 | 0.05 | 0.05 | 0.05 | 0.05 | 0.05 | 0.05 | 0.05 |
| $ZrO_2$ | 2 | 2 | 2 | 2 | 2 | 2 | 2 | 2 | 2 |
| $Fe_2O_3$ | 0.005 | 0.005 | 0.005 | 0.005 | 0.013 | 0.013 | 0.013 | 0.005 | 0.005 |
| β-OH | 0.28 | 0.28 | 0.27 | 0.26 | 0.21 | 0.21 | 0.23 | 0.24 | 0.23 |
| Density | 2.46 | 2.44 | 2.45 | 2.46 | 2.44 | 2.44 | 2.45 | 2.43 | 2.42 |
| Average coefficient α of thermal expansion | 71.6 | 69.6 | 70.4 | 71 | 68.3 | 68 | 68.6 | 66.1 | 64.9 |
| Glass transition temperature Tg | 555 | 568 | 570 | 561 | 572 | 577 | 570 | 573 | 572 |
| Young's modulus E | 84.4 | 83 | 84.3 | 84.1 | 82.8 | 82.8 | 82.7 | 82.3 | 81.7 |
| Modulus of rigidity G | 34.4 | 34 | 34.4 | 34.2 | | | | | |
| Poisson ratio | 0.22 | 0.22 | 0.22 | 0.22 | | | | | |
| Softening temperature Ts | 767 | 795 | 793 | 780 | 803 | 814 | 797 | | |
| Tf | 707 | 720 | 722 | 713 | 724 | 729 | 722 | 725 | 724 |
| $X_2$ | 604 | 578 | 593 | 598 | 565 | 563 | 567 | 544 | 530 |
| $X_2$ | 707 | 720 | 722 | 713 | 724 | 729 | 722 | 725 | 724 |
| $X_3$ | 352 | 352 | 352 | 352 | 352 | 352 | 352 | 352 | 352 |
| $X_1 + X_2 + X_3$ | 1663 | 1650 | 1667 | 1663 | 1642 | 1645 | 1641 | 1621 | 1606 |
| Thermal conductivity σ20 | | 1.14 | | | | | | | |
| Thermal conductivity σ500 | <1.44> | 1.46 | <1.44> | <1.43> | <1.43> | <1.43> | <1.43> | <1.44> | <1.43> |
| Mirror constant of the annealed glass | | | | | | | | | |
| Crystallization temperature Tc | 901 | 936 | 926 | 931 | 857 | 847 | 859 | | |
| Tc − Ts | 133.9 | 141 | 132.7 | 151 | 53.9 | 32.4 | 62.8 | | |
| CS1 | 958 | 956 | 976 | 1004 | 994 | 1001 | 982 | 948 | 916 |
| DOL1 | 7 | 8 | 7 | 6 | 9 | 9 | 8 | 9 | 10 |
| DOL2 | 148 | 154 | 150 | 143 | 158 | 159 | 157 | 164 | 168 |
| CS3 | 356 | 318 | 336 | 322 | 321 | 325 | 314 | 321 | 303 |
| DOL3 | 89 | 99 | 93 | 101 | 102 | 105 | 106 | 102 | 108 |

Regarding each glass in Cases 2, 3 and 4, bend forming was performed using the apparatus of FIG. 1.

In the glass of Case 4 having a value of $X_1+X_2+X_3$ being more than 1760, cracks were frequently generated during the bend forming. On the other hand, in the glasses of Cases 2 and 3 having a value of $X_1+X_2+X_3$ being 1760 or less, the bend forming could be performed without causing a problem of cracks. Similarly, in the glasses of Cases 1 and 7 to 38 having a value of $X_1+X_2+X_3$ being 1760 or less, it is assumed that the bend forming can be performed without causing a problem of cracks. However, regarding the glass in Case 2, cloudiness was sometimes generated in the glass sheet.

The glass in Case 5 having a value of $X_1+H_2+X_3$ being 1760 or less but a Young's modulus of less than 70 GPa was easily scratched during handling.

While the present invention is described in detail and with reference to specific embodiments thereof, it is apparent to one skilled in the art that various changes and modifications can be made therein without departing from the spirit and scope of the present invention. The present application is based on Japanese Patent Application No. 2016-204745 filed on Oct. 18, 2016 and Japanese Patent Application No. 2017-141283 filed on Jul. 20, 2017, the entire contents of which are incorporated herein by reference. In addition, all references cited herein are incorporated by reference in their entirety.

REFERENCE SIGNS LIST

1: Glass sheet
2: Bend forming mold (lower mold)
3: Bend forming mold (upper mold)
4: Press
10: Atmosphere replacing chamber
20 Forming chamber
21: Heating zone
22: Forming zone
23: Cooling zone
30: Air replacing chamber

The invention claimed is:

1. A glass for chemical strengthening, having a Young's modulus E of 70 GPa or more, and satisfying $X_1+X_2+X_3$ being 1760 or less, where $X_1$ is a numerical value equivalent to a value [unit: kPa/° C.] obtained by multiplying the Young's modulus E by an average coefficient α of thermal expansion at 50° C. to 350° C., $X_2$ is a numeral value equivalent to a value of a temperature Tf [unit: ° C.] at which a viscosity of the glass reaches 100 MPa·s, and $X_3$ is a numerical value equivalent to a value of a difference [unit: $10^5$ Pa·s] between the viscosity (100 MPa·s) at the Tf and a viscosity $\eta_{l10}$ at a temperature 10° C. higher than the Tf, wherein the glass is a lithium aluminosilicate glass comprising, in mass percentage on the basis of oxides: $SiO_2$ in an amount of 56 to 73%; $Al_2O_3$ in an amount of 10 to 24%; $B_2O_3$ in an amount of 0 to 6%; $P_2O_5$ in an amount of 0 to 6%; $Li_2O$ in an amount of 2 to 7%; $Na_2O$ in an amount of 3 to 8%; $K_2O$ in an amount of 0.2 to 5%; MgO in an amount of 0 to 8%; CaO in an amount of 0 to 2%; SrO in an amount of 0 to 5%; BaO in an amount of 0 to 5%; ZnO in an amount of 0 to 5%; $TiO_2$ in an amount of 0 to 2%; and $ZrO_2$ in an amount of 0.5 to 4%.

2. The glass for chemical strengthening according to claim 1, comprising in mass percentage on the basis of oxides: $SiO_2$ in an amount of 56 to 72%; $Al_2O_3$ in an amount of 11 to 20%; $B_2O_3$ in an amount of 0 to 5%; $P_2O_5$ in an amount of 0 to 4%; $Li_2O$ in an amount of 3 to 6%; $Na_2O$ in an amount of 4 to 6%; $K_2O$ in an amount of 0.5 to 3%; MgO in an amount of 0 to 6.5%; CaO in an amount of 0 to 1%; SrO in an amount of 0 to 4%; BaO in an amount of 0 to 4%; ZnO in an amount of 0 to 2%; $TiO_2$ in an amount of 0 to 0.5%; and $ZrO_2$ in an amount of 0.75 to 3%.

3. The glass for chemical strengthening according to claim 1, satisfying $X_1+X_2+X_3$ being 1670 or less.

4. The glass for chemical strengthening according to claim 1, which shows no crystallization peak or has a crystallization peak temperature being higher than a softening temperature of the glass, as measured by differential scanning calorimetry from room temperature to 1000° C. at a temperature rising rate of 10° C./min.

5. The glass for chemical strengthening according to claim 1, having a thermal conductivity at 500° C. of 1.3 W/mK or more.

6. The glass for chemical strengthening according to claim 1, having a mirror constant of 2.0 MPa·m$^{1/2}$ or more.

7. The glass for chemical strengthening according to claim 1, having an mirror constant of the annealed glass of 2.0 MPa·m$^{1/2}$ or more, the mirror constant of the annealed glass being obtained by measuring a mirror constant after the glass is held at a temperature 30° C. higher than a glass transition temperature Tg for 1 hour, followed by annealing the glass to room temperature at a cooling rate of 1° C./min.

8. The glass for chemical strengthening according to claim 1, having a softening temperature of 820° C. or less.

9. A method for manufacturing a chemically strengthened glass, comprising heating and bend-forming the glass for chemical strengthening according to claim 1 on a bend forming mold, followed by chemical strengthening.

10. The method for manufacturing a chemically strengthened glass according to claim 9, wherein the bend forming is performed by a press forming method.

11. A glass for chemical strengthening, having a Young's modulus E of 80 to 90 GPa and an average coefficient α of thermal expansion at 50° C. to 350° C. of $60 \times 10^{-7}$ to $85 \times 10^{-7}$/° C., and comprising, in mass percentage on the basis of oxides: $SiO_2$ in an amount of 56 to 73%; $Al_2O_3$ in an amount of 10 to 24%; $B_2O_3$ in an amount of 0 to 6%; $P_2O_5$ in an amount of 0 to 6%; $Li_2O$ in an amount of 2 to 7%; $Na_2O$ in an amount of 3 to 8%; $K_2O$ in an amount of 0.2 to 5%; MgO in an amount of 0 to 8%; CaO in an amount of 0 to 2%; SrO in an amount of 0 to 5%; BaO in an amount of 0 to 5%; ZnO in an amount of 0 to 5%; $TiO_2$ in an amount of 0 to 2%; and $ZrO_2$ in an amount of 0.5 to 4%.

12. The glass for chemical strengthening according to claim 11, which has a Tf of 780° C. or less.

13. The glass for chemical strengthening according to claim 11, which shows no crystallization peak or has a crystallization peak temperature being higher than a softening temperature of the glass, as measured by differential scanning calorimetry from room temperature to 1000° C. at a temperature rising rate of 10° C./min.

14. The glass for chemical strengthening according to claim 11, having a thermal conductivity at 500° C. of 1.3 W/mK or more.

15. The glass for chemical strengthening according to claim 11, having a mirror constant of 2.0 MPa·m$^{1/2}$ or more.

16. The glass for chemical strengthening according to claim 11, having an mirror constant of the annealed glass of 2.0 MPa·m$^{1/2}$ or more, the mirror constant of the annealed glass being obtained by measuring a mirror constant after the glass is held at a temperature 30° C. higher than a glass transition temperature Tg for 1 hour, followed by annealing the glass to room temperature at a cooling rate of 1° C./min.

17. The glass for chemical strengthening according to claim 11, having a softening temperature of 820° C. or less.

18. A method for manufacturing a chemically strengthened glass, comprising heating and bend-forming the glass for chemical strengthening according to claim 11 on a bend forming mold, followed by chemical strengthening.

19. The method for manufacturing a chemically strengthened glass according to claim 18, wherein the bend forming is performed by a press forming method.

20. A chemically strengthened glass, having a curved surface shape by bend-forming, and having a base composition comprising, in mass percentage on the basis of oxides: $SiO_2$ in an amount of 56 to 73%; $Al_2O_3$ in an amount of 10 to 24%; $B_2O_3$ in an amount of 0 to 6%; $P_2O_5$ in an amount of 0 to 6%; $Li_2O$ in an amount of 2 to 7%; $Na_2O$ in an amount of 3 to 8%; $K_2O$ in an amount of 0.2 to 5%; MgO in an amount of 0 to 8%; CaO in an amount of 0 to 2%; SrO in an amount of 0 to 5%; BaO in an amount of 0 to 5%; ZnO in an amount of 0 to 5%; $TiO_2$ in an amount of 0 to 2%; and $ZrO_2$ in an amount of 0.5 to 4%, wherein devitrification is not observed.

* * * * *